(12) United States Patent
Koseki

(10) Patent No.: US 8,601,347 B1
(45) Date of Patent: Dec. 3, 2013

(54) FLASH MEMORY DEVICE AND STORAGE CONTROL METHOD

(75) Inventor: Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/520,282

(22) PCT Filed: Jun. 21, 2012

(86) PCT No.: PCT/JP2012/004015
§ 371 (c)(1),
(2), (4) Date: Jul. 2, 2012

(51) Int. Cl.
*H03M 13/00* (2006.01)

(52) U.S. Cl.
USPC .................................... 714/764; 714/758

(58) Field of Classification Search
USPC ............... 714/764, 702, 746, 751, 758
See application file for complete search history.

(56) References Cited

U.S. PATENT DOCUMENTS

| | | | |
|---|---|---|---|
| 7,895,509 B1* | 2/2011 | Cory et al. ........... | 714/801 |
| 2008/0016430 A1* | 1/2008 | Yoshida ............... | 714/764 |
| 2008/0282106 A1* | 11/2008 | Shalvi et al. ......... | 714/6 |
| 2010/0251075 A1* | 9/2010 | Takahashi et al. ..... | 714/773 |
| 2010/0269000 A1* | 10/2010 | Lee .................... | 714/718 |
| 2011/0231713 A1* | 9/2011 | Takada et al. ........ | 714/54 |
| 2011/0314354 A1* | 12/2011 | Fillingim ............. | 714/760 |
| 2012/0030542 A1* | 2/2012 | Borchers et al. ...... | 714/764 |
| 2012/0066568 A1* | 3/2012 | Komagome ........... | 714/764 |
| 2012/0102380 A1 | 4/2012 | Ishikawa et al. | |
| 2012/0131418 A1* | 5/2012 | Tarui et al. .......... | 714/763 |
| 2012/0226954 A1* | 9/2012 | Obata et al. ......... | 714/752 |

OTHER PUBLICATIONS

Freitas, R. F.; Wilcke, W. W.; , "Storage-class memory: The next storage system technology," IBM Journal of Research and Development , vol. 52, No. 4.5, pp. 439-447, Jul. 2008.*
Kai, Bu, et al.: "The Optimization of the Hierarchical Storage System Based on the Hybrid SSD Technology", 2012 Second International Conference on, IEEE, Jan. 6, 2012; pp. 1323-1326.*
Kai, Bu, et al.; The Optimization of the Hierarchical Storage System Based on the Hybrid SSD Technology; 2012 International Conference on Intelligent Systems Design and Engineering Application; Jan. 6, 2012; pp. 1323-1326.
PCT International Search Report and Written Opinion on application PCT/JP2012/004015 mailed Sep. 6, 2012; 14 pages.
Jung, Jaemin, et al.; "FRASH: Exploiting Storage Class Memory in Hybrid File System for Hierarchical Storage"; ACM Transactions on Storage, vol. 6, No. 1, Article 3, Mar. 2010; pp. 3.1 to 3:25.

* cited by examiner

*Primary Examiner* — Cynthia Britt
(74) *Attorney, Agent, or Firm* — Foley & Lardner LLP

(57) ABSTRACT

When writing data to a first-type FM part, an FM controller of a flash memory device (A1) generates a redundant code, and (A2) writes the data and the redundant code, when reading the written data, the flash memory controller (B1) reads the data and the redundant code, (B2) corrects any bit errors based on the redundant code, (B3) generates error correction information including positions of the bit errors occurring and values before the bit errors occurred, and (B4) writes the error correction information to a second-type FM part. Subsequently, when reading the data, the flash memory controller (C1) reads the data and the redundant code, (C2) reads the error correction information, (C3) corrects the data and the redundant code based on the error correction information, (C4) corrects any bit errors based on the corrected redundant code.

12 Claims, 24 Drawing Sheets

Fig. 13

| FM # | Block # | Attribute | Erase times | Number of valid pages |
|---|---|---|---|---|
| N | 0 | In-use | 12 | 12 |
| | 1 | Empty | 0 | 0 |
| | ... | ... | ... | ... |
| | N | N | N | N |

| FM # | Block # | Physical page # | Page attribute | Number of bit errors occurred | | | |
|---|---|---|---|---|---|---|---|
| 1401 | 1402 | 1403 | 1404 | 14051 Total | 14052 CW #0 | 14053 ... | 14054 CW #N |
| N | N | 0 | Valid | 27 | 12 | ... | 12 |
| | | 1 | Invalid | 36 | 1 | ... | 34 |
| | | ... | ... | ... | ... | ... | ... |
| | | N | Empty | 0 | 0 | ... | 0 |

| Segment # | Start address | Last address | Attribute | Number of error correction information elements stored |
|---|---|---|---|---|
| 1 | 0 | 99 | Invalid | 0 |
| 2 | 100 | 199 | Valid | 1 |
| ... | ... | ... | ... | ... |
| N | N | N | N | N |

Fig. 15

FLASH MEMORY DEVICE AND STORAGE CONTROL METHOD

TECHNICAL FIELD

The present invention relates to flash memory devices including flash memory.

BACKGROUND ART

For example, NAND type flash memory (referred to as NAND flash memory), which is adopted in flash memory devices, such as SSDs, stores both data to be stored in NAND flash memory (hereinafter, store target data) and an error correcting code (e.g., ECC (Error Correcting Code)) for that store target data in order to ensure data reliability. In flash memory devices, when reading the store target data, if the number of bit errors in the store target data is within the number of bit errors that can be corrected by using an ECC (hereinafter, the number of correctable bits), then data correction is performed with the ECC and the data to be stored after the correction is read. Generally, as the data volume of an ECC stored with the store target data increases, the number of correctable bits becomes larger.

As structural miniaturization advances, large capacity NAND flash memory becomes more difficult to produce, which tends to lead to degradation of its quality, such as a lower upper limit on the number of rewrite processes and/or a shortened data retention period, and so on. For example, in 2×nm generation of miniature, but large capacity MLC NAND flash memory, even if an ECC, which is sized as required by the flash memory vendor (company that sells flash memory), is stored with the store target data, only around several thousands of rewrite cycles (or erase cycles) are guaranteed in the first place. Further, as mentioned above, since there is a tendency of decrease in quality of flash memory, the MLC NAND flash memory lacks reliability, while having a large capacity. Accordingly, it is difficult to adopt NAND flash memory as enterprise use without any measures being taken. Thus, SSD vendors (companies that manufacture SSDs with flash memory available from flash memory vendors and sell the manufactured SSD) have been taking their own measures for NAND flash memory, such as lifetime extension measures.

The next generation flash memory that will replace NAND flash memory includes SCM (Storage Class Memory) flash memory (see Non-Patent Document 1). As compared with NAND flash memory, SCM flash memory has higher performance that achieves faster response speed at the time of read and write, as well as higher durability that provides a higher upper limit on the number of rewrite processes. In addition, depending on the specifications, SCM flash memory has a characteristic that enables data read and write on a per-byte basis as well as data erase on a per-byte basis.

CITATION LIST

Non Patent Literature

NPL 1: J. Jung, Y. Won, E. Kim, H. Shin, and B. Jeon. FRASH: Exploiting storage class memory in hybrid file system for hierarchical storage. ACM Transactions on Storage, 6(1): 1_25, 2010

SUMMARY OF INVENTION

Technical Problem

One of lifetime extension measures taken for SSDs adopting NAND flash memory is to increase the number of correctable bits of an ECC. For example, by reducing the number of SCSI blocks in each page of NAND flash memory for storing the store target data, an ECC having a larger size than is required by the flash memory vendor can be stored in the remaining space in the page, which results in an increase in the number of correctable bits of the ECC.

The longer NAND flash memory used, the more bit errors will occur. As mentioned above, however, even a large number of bit errors can be corrected by increasing the number of bits that can be corrected by using an ECC, and hence NAND flash memory can be used for a long period of time without refresh processes. That is, this measure can provide an extended lifetime to NAND flash memory.

However, this measure will be taken at the sacrifice of capacity of SSDs, as well as high performance, which is inherently possessed by SSDs. For example, one page of common NAND flash memory is composed of 16 (total capacity, 8 KB) SCSI blocks for storing data and a block for storing an ECC (hereinafter, an ECC block). Compared to this, if the SCSI blocks for storing the store target data are reduced to a number of 15 (total capacity, 7.5 KB), and if some measures are taken to store an ECC to one SCSI block and the ECC block, then it is possible to store, in one page, such an ECC that has a volume increased by an amount corresponding to the capacity of one SCSI block (0.5 KB). This may increase the number of correctable bits of an ECC.

However, applications running on Windows® or Unix generally produce many I/O (Input/Output) commands for 4 KB of data. Thus, according to this measure, it is only possible to store data associated with one I/O command in a SCSI block (with a total capacity of 7.5 KB) where one page of store target data will be stored. That is, this measure will produce a pattern such that data associated with an I/O command for 4 KB spans across two pages. Once data spans across two pages, data must be read from two pages or otherwise written to two pages, which may deteriorate the performance and lifetime of SSDs. Therefore, it is desirable to store data of a multiple of eight SCSI blocks (4 KB) in one page in terms of performance.

In addition, this measure poses problems such that an ECC circuit for producing ECCs becomes larger in size, and since the amount of data that can be stored in one page is reduced, the capacity that is available to the user based on the total capacity of NAND flash memory is reduced.

On the other hand, as mentioned above, since SCM flash memory enables data read and write on a per-byte basis depending on the specifications, it is unlikely that performance is degraded if the data size of an ECC is increased. However, it is difficult to obtain large capacity SCM flash memory for a low price.

Solution to Problem

A flash memory device comprises a storage part including a first-type flash memory part and a second-type flash memory part, and a flash memory controller for controlling the storage part. When writing data to be written to the first-type flash memory part, the flash memory controller (A1) generates a redundant code relating to the data, and (A2) writes the data and the redundant code to the first-type flash memory part.

When reading the data written to the first-type flash memory part, the flash memory controller (B1) reads the data and the redundant code from the first-type flash memory part, (B2) corrects any bit errors occurring in the data and the redundant code based on the redundant code, (B3) generates error correction information including one or more positions of one or more bit errors occurring in the data and the redundant code as well as values before the one or more bit errors occurred, and (B4) writes the error correction information to the second-type flash memory part.

Subsequently, when reading the data written to the first-type flash memory part, the flash memory controller (C1) reads the data and the redundant code from the first-type flash memory part, (C2) reads the error correction information corresponding to the data from the second-type flash memory part, (C3) corrects the data and the redundant code read from the first-type flash memory part based on the error correction information, (C4) corrects any bit errors occurring in the corrected data and the corrected redundant code based on the redundant code corrected in the (C3), (C5) updates the error correction information by adding, to the error correction information, positions of the bit errors corrected in the (C4) as well as values before the bit errors occurred, and (C6) writes the updated error correction information to the second-type flash memory part.

BRIEF DESCRIPTION OF DRAWINGS

FIG. 13 is a diagram showing an example of a block management table according to the first embodiment.

FIG. 14 is a diagram showing an example of a page management table according to the first embodiment.

FIG. 15 is a diagram showing an example of a segment management table according to the first embodiment.

DESCRIPTION OF EMBODIMENTS

Embodiments are now described with reference to the drawings. Note that the following embodiments do not limit the invention relevant to the scope of claims. In addition, various elements and all combinations thereof described in the embodiments are not necessarily required in the solution of the present invention.

In the following description, various pieces of information are illustrated in the form of "aaa table" but may be illustrated in the form of a data structure other than a table. In order to describe that the various pieces of information are independent of the data structure, "aaa table" can be referred to as "aaa information."

Furthermore, in the following description, some processes are described using "program" as the subject of the sentence; however, the subject of the sentence describing some processes may be "processor," because the program is executed by a processor (e.g., a CPU (Central Processing Unit)), to perform a defined process by appropriately using a storage resource (e.g., memory) and/or a communication interface device (e.g., a communication port). The process that is described using "program" as the subject may be performed by the processor or a device having the processor (e.g., a controller, a flash memory package). In addition, some or all of the program may be implemented by a dedicated hardware. Thus, the process that is described using "program" as the subject may be performed by a controller. The controller may be the processor itself or may include a hardware circuit that partially or entirely carries out a process performed by the controller. The program may be installed from a program source into each controller. The program source may be, for example, a program distribution server or a storage medium.

First Embodiment

Firstly, a computer system according to a first embodiment will be described below.

Figure 1:
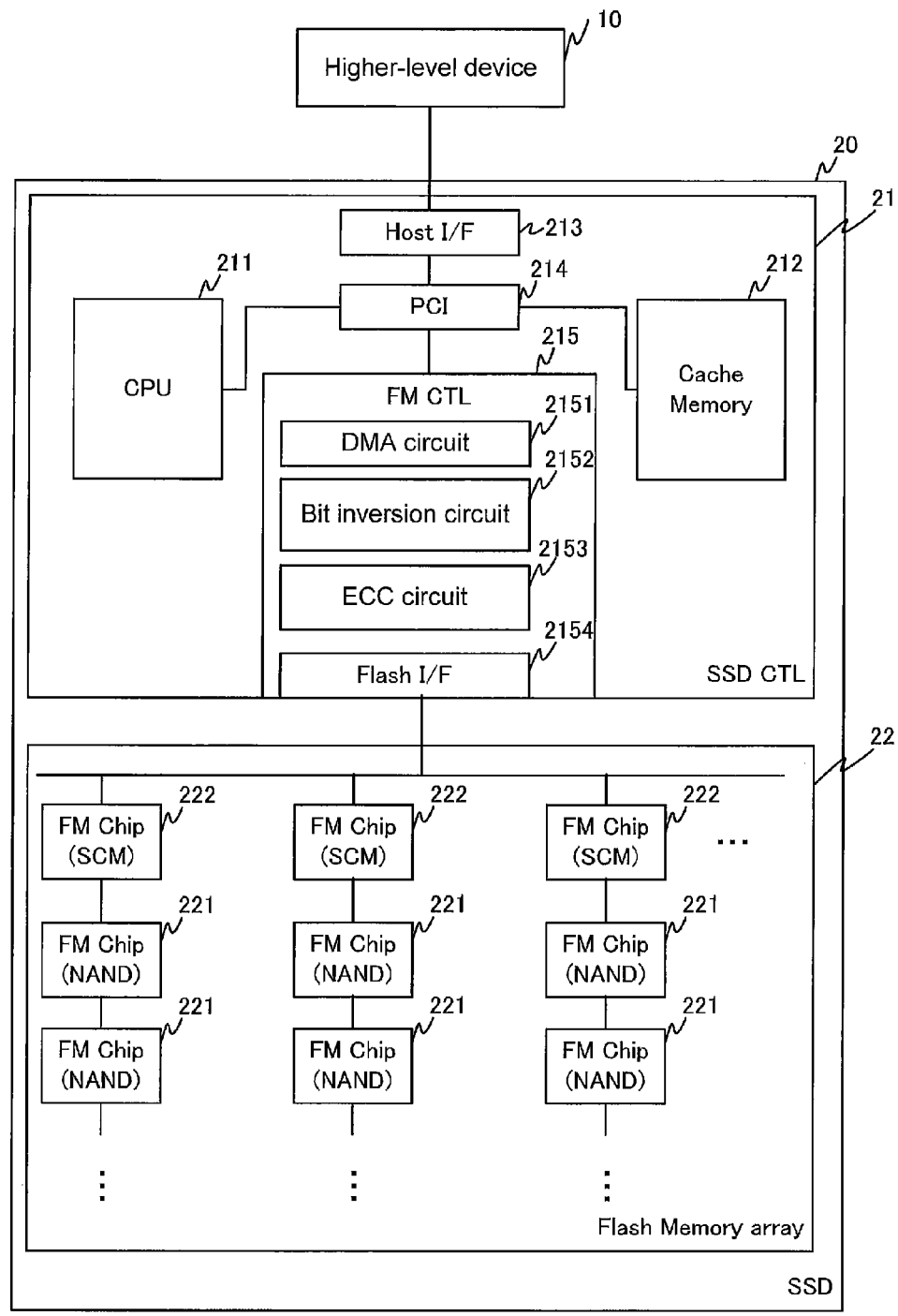
FIG. 1 is a schematic structure figure of a computer system including an SSD according to a first embodiment.

FIG. 1 is a schematic structure figure of a computer system including an SSD according to a first embodiment.

The computer system comprises a higher-level device 10 and an SSD (Solid State Drive) 20 as an example of a flash memory device. The SSD 20 is communicatively coupled to the higher device 10 via a communication network (e.g., a LAN (Local Area Network)). For example, the higher-level device 10 may be a host computer or a controller of a storage system. In the following description, a host computer is taken as an example of the higher device 10, which will be denoted a host computer 10.

For example, the host computer 10 is an application server. The host computer 10 is installed with control software (not shown), which is executing on the host computer 10 for issuing control commands, such as write command or read command, to the SSD 20.

The SSD 20 includes an SSD controller 21 and a storage part 22. Te SSD controller 21 controls operation of the SSD 20. The SSD controller 21 contains a CPU (Central Processing Unit) 211, cache memory 212, a host I/F (Interface) 213, and an FM controller (FM CTL) 215. For example, the CPU 211, the cache memory 212 and the host I/F 213 are connected to the FM controller 215 by a dedicated connection bus, such as a PCI (Peripheral Component Interconnect) 214.

The CPU 211 controls the entire SSD 20. The cache memory 212 is, e.g., volatile memory such as DRAM (Dynamic RAM). Incidentally, some or all of the cache memory 212 may be SCM flash memory. The cache memory 212 stores computer program and/or data required by the CPU 211 to control the SSD 20. In addition, the cache memory 212 temporarily stores the data transferred from the host computer 10 and the data transferred from the storage part 22 (a NAND flash memory chip 221 and an SCM flash memory chip 222). The host I/F 213 is an interface for coupling the SSD 20 to the host computer 10.

For example, the FM controller 215 is an integrated circuit that performs a parity operation and so on. The FM controller 215 contains a DMA (Direct Memory Access) circuit 2151, a bit inversion circuit 2152, an ECC (Error Correcting Code) circuit 2153, and a Flash I/F 2154.

The DMA circuit 2151 is a circuit that performs data transfer between a cache memory 212 and flash memory chips (221, 222) without intervention by the CPU 211.

The bit inversion circuit 2152 is a circuit that inverts the value of a data item at a predetermined bit position to "0" or "1" among those data items that are read from flash memory chips (221, 222) based on, e.g., error correction information, which will be described later.

The ECC circuit 2153 is a circuit that generates an ECC (an example of redundant code) for the data to be stored in flash memory chips (221, 222), and performs an error check on data read from flash memory chips (221, 222). In addition, if an error occurs in data read from a flash memory chip, the ECC circuit 2153 transfers, to a SCM flash memory 222, a value of data relating to the bit position of the data for which an error occurs and a value of data before an error occurs in that bit position, i.e., a normal value ("0" or "1") of the data. The SCM flash memory 222 manages these values of transferred data from the ECC circuit 2153 as error correction information. The flash I/F 2154 is an interface for coupling the storage part 22 to the SSD controller 21.

For example, the storage part 22 is a flash memory array that includes a plurality of flash memory chips (221, 222). In the example shown in the FIG. 1, the storage part 22 includes a plurality of NAND-type flash memory chips (hereinafter, NAND (NotAND) FM chips) 221 and SCM (Storage Class Memory)-type flash memory chips (hereinafter, SCM FM chips) 222. In this case, the NAND FM chips 221 correspond to first-type flash memory parts and the SCM FM chips 222 correspond to second-type flash memory parts.

The SCM FM chips 222 achieve faster response times to read/write and higher performance, and provide a higher upper limit on the number of rewrite processes and higher durability, as compared with the NAND FM chips 221. In addition, the SCM FM chip 222 has a characteristic that enables access on a per-byte basis and erase of data on a per-byte basis. In this embodiment, the NAND FM chips 221 have a greater capacity than the SCM FM chips 222. In the example shown in the FIG. 1, the storage part 22 includes a larger number of NAND FM chips 221 and a smaller number of SCM FM chips 222 in relation to each other.

Figure 2:
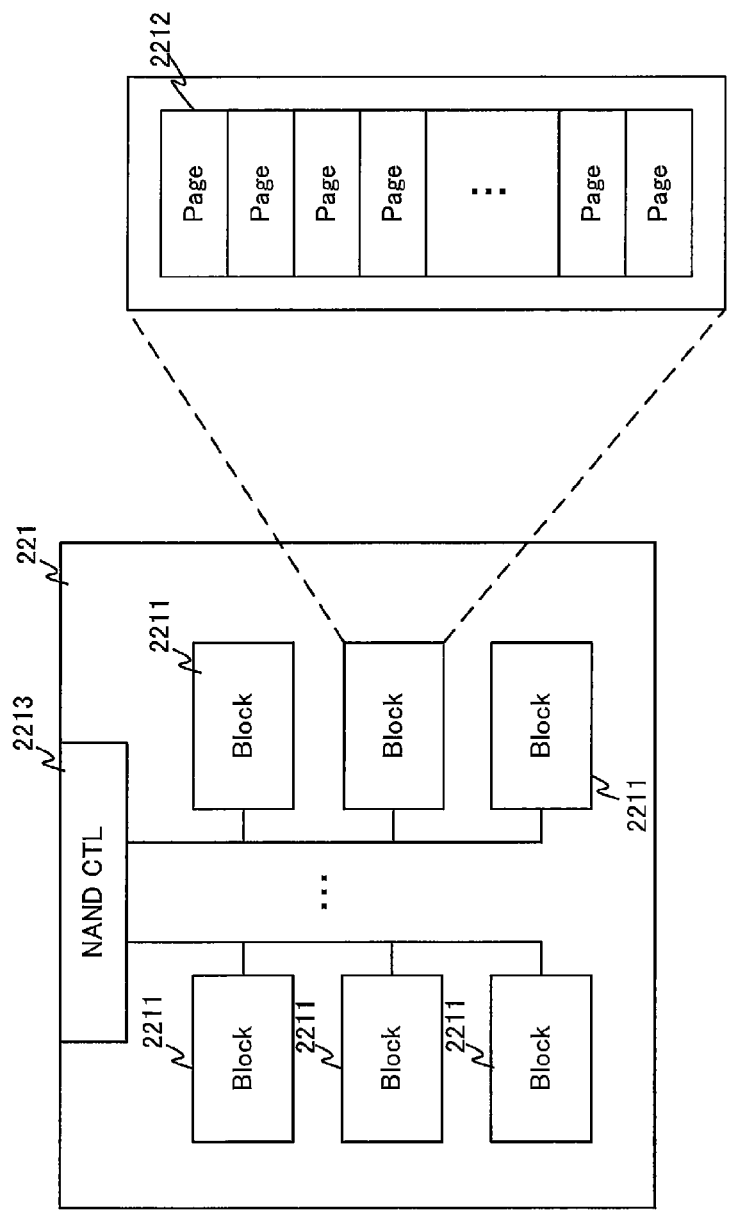
FIG. 2 is an internal structure figure of an example of an NAND FM chip according to the first embodiment.

FIG. 2 is an internal structure figure of an example of an NAND FM chip according to the first embodiment.

A NAND FM chip 221, which is non-volatile semiconductor memory, includes a plurality of blocks 2211 and a NAND controller (NAND CTL) 2213. Each block 2211 contains a plurality of physical pages 2212. The NAND controller 2213 performs a process corresponding to a read/write request from the FM controller 215 for a plurality of blocks 2211 (a plurality of physical pages 2212). The NAND controller 2213 can access multiple blocks 2211 at the same time.

In the NAND FM chip 221, data write or read is performed on a per physical page basis, while data erase is performed on a per-block basis. The size of each physical page is, e.g., around 4 KB or 8 KB. When an attempt is made to rewrite the stored data in the NAND FM chip 221, it is not possible to rewrite data to a physical region (a physical page 2212) where that data is stored. Accordingly, for example, upon receipt of update data for the data stored in a certain physical page 2212 from the host computer 10, the FM controller 215 writes the received update data to a physical page 2212, which is different from the certain physical page 2212. At this point, the FM controller 215 updates the mapping between a logical page address (an LBA) and a physical page address, recognized at the side of the host computer 10, in an address conversion table 1122 (see FIG. 12), which will be described later. Additionally, the FM controller 215 manages data before update as invalid data and data after updating as valid data. The physical page 2212 in which invalid data is stored will be subjected to erase. A physical page that stores valid data and is mapped to an LBA will be referred to as a valid page, while a physical page, which stores invalid data and is not mapped to an LBA will be referred to as an invalid page.

Figure 3:
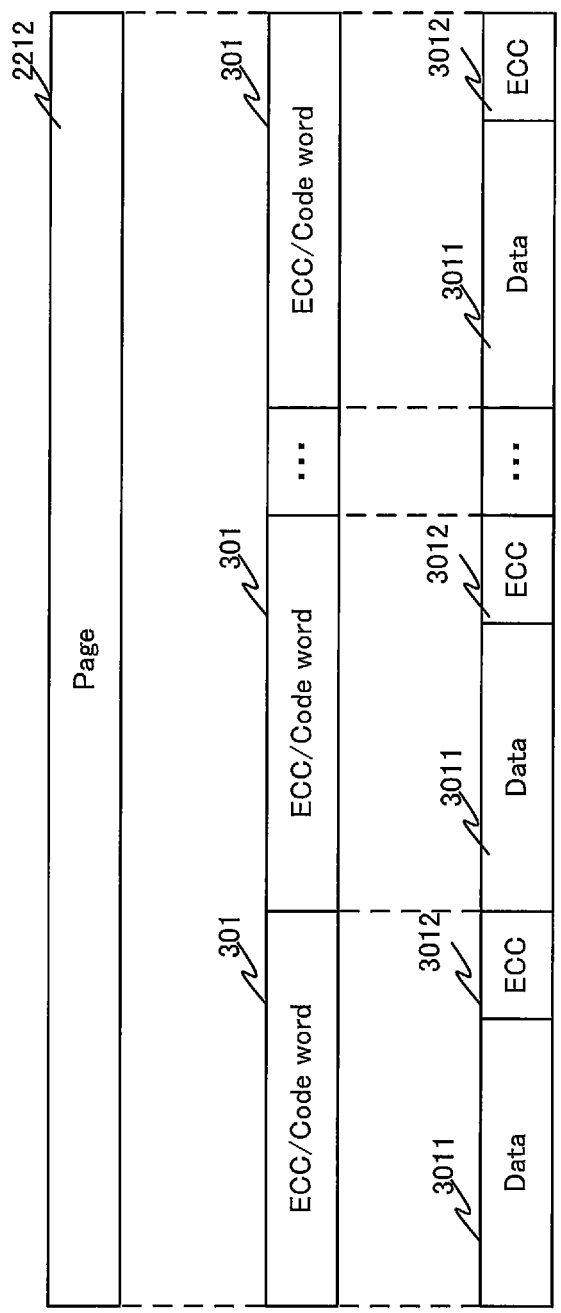
FIG. 3 is a schematic diagram explaining a physical page of a NAND FM chip according to the first embodiment.

FIG. 3 is a schematic diagram explaining a physical page of a NAND FM chip according to the first embodiment. FIG. 3 shows a certain page of a plurality of physical pages 2212 contained in a block 2211.

A physical page 2212 contains storage regions for a plurality of ECC/Code word 301 (e.g., storage regions for eight ECC/Code word 301). For example, if data written from the host computer 10, or alternatively management information data (such as an address conversion table) of the SSD 20 is to be stored in a physical page 2212, then the data is divided by the number of regions of ECC/Code word 301, and the divided data 3011 and an ECC 3121 corresponding to the data 3011 are stored in the storage region for each ECC/Code word 301. In this way, dividing data to be stored in a physical page 2212 prior to the storage can reduce the data size of an ECC provided to data and therefore reduce the circuit scale of an ECC circuit 2153. Meanwhile, data may also be stored to a physical page 2212 without being divided. In this case, one physical page 2212 contains a storage region for one Code word 301.

Figure 4:
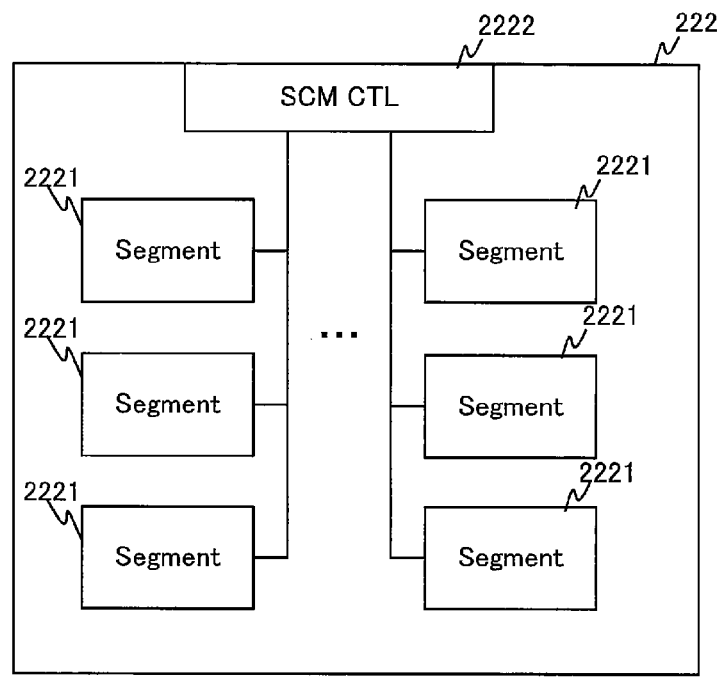
FIG. 4 is an internal structure figure of an example of an SCM FM chip according to the first embodiment.

FIG. 4 is an internal structure figure of an example of an SCM FM chip according to the first embodiment.

For example, the SCM FM chip 222 is configured to be able to access on a per-byte basis and has a plurality of segments 2221 with a predetermined number of bytes. That is, the SCM FM chip 222 can access in smaller units than the NAND FM chip 221. The storage space of the SCM FM chip 222 is managed in units of these segments. For example, a read/write request from the FM controller 215 for the SCM FM chip 222 may be performed on a per segment 2221 basis. In this case, the SCM controller 2222 of the SCM FM chip 222 processes a read/write request from the FM controller 215, taking each segment 2221 as the smallest unit. The SCM FM is a kind of non-volatile semiconductor memory, e.g., MRAM (Magnetic Random Access Memory, PRAM (Phase Change Random Access Memory), ReRAM (Resistance Random Access Memory).

Figure 5:
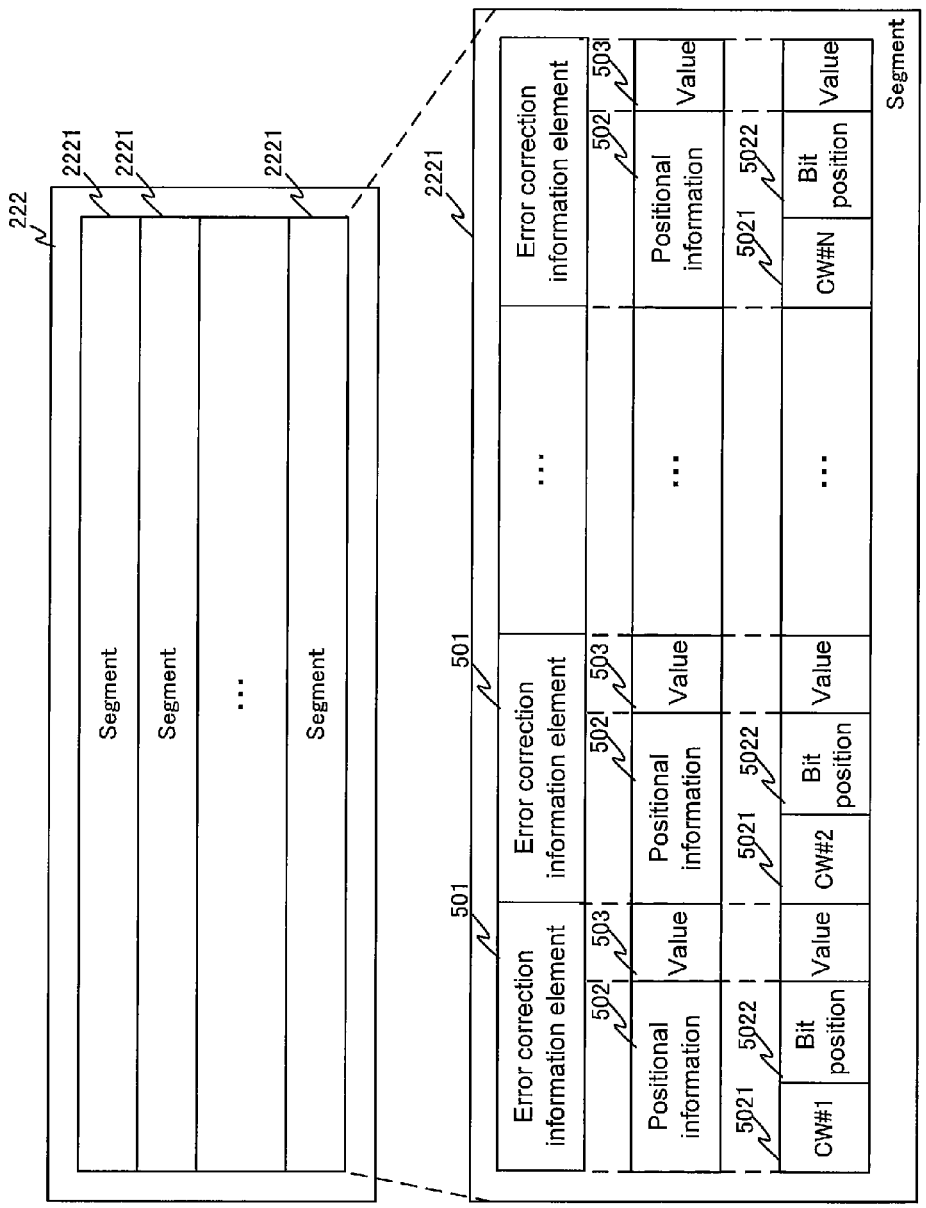
FIG. 5 is a schematic diagram explaining a segment of an SCM FM chip according to the first embodiment.

FIG. 5 is a schematic diagram explaining a segment of an SCM FM chip according to the first embodiment. FIG. 5 illustrates a plurality of segments 2221, one of which is shown in detail.

In this embodiment, one segment 2221 of the SCM FM chip 222 is mapped to one physical page 2212 of the NAND FM chip 221. Incidentally, a physical page 2212 may not be mapped to a segment 2221, e.g., if the data stored in the physical page 2212 is of low importance. A plurality of error correction information elements 501 relating to data stored in one physical page 2212 may be stored in one segment 2221. In this case, one or more error correction information elements 501 represent error correction information.

Stored in an error correction information element 501 is information about a bit error that has occurred in data stored in the mapped physical page 2212. In this embodiment, information about one bit error is stored in one error correction information element 501. Each error correction information element 501 includes positional information 502 and a value 503.

The positional information 502 is information for locating an error that has occurred in a physical page 2212. The value 503 represents a value before an error occurred in data stored in such a location in a physical page 2212 that is identified by the positional information 503, i.e., information indicating to which value the original data (normal data) was set ("0" or "1").

In FIG. 5, each positional information 502 contains a Code Word (CW) #5021 and a bit position 5022. The CW #5021 is a number to identify a partial physical page (Code Word), which is obtained by dividing a physical page 2212 mapped to a segment 2221 into a predetermined number of parts. The bit position 5022 is information indicating in which bit of the CW indicated by CW #5021 a bit error has occurred.

In this way, managing a bit error that has occurred in a physical page 2212 for each CW #5021 can reduce the data size to be processed by the bit inversion circuit 2152, which can thus reduce the circuit scale of the bit inversion circuit 2152.

A CW #5021 and an error correction information element 501 may have a one-to-one relationship, or, if multiple bit errors have occurred in a particular CW #5021, a plurality of error correction information elements 501 may be mapped to one CW #5021. That is, a plurality of error correction information elements 501 may be mapped to a particular CW #5021 that is susceptible to bit errors.

Figure 6:
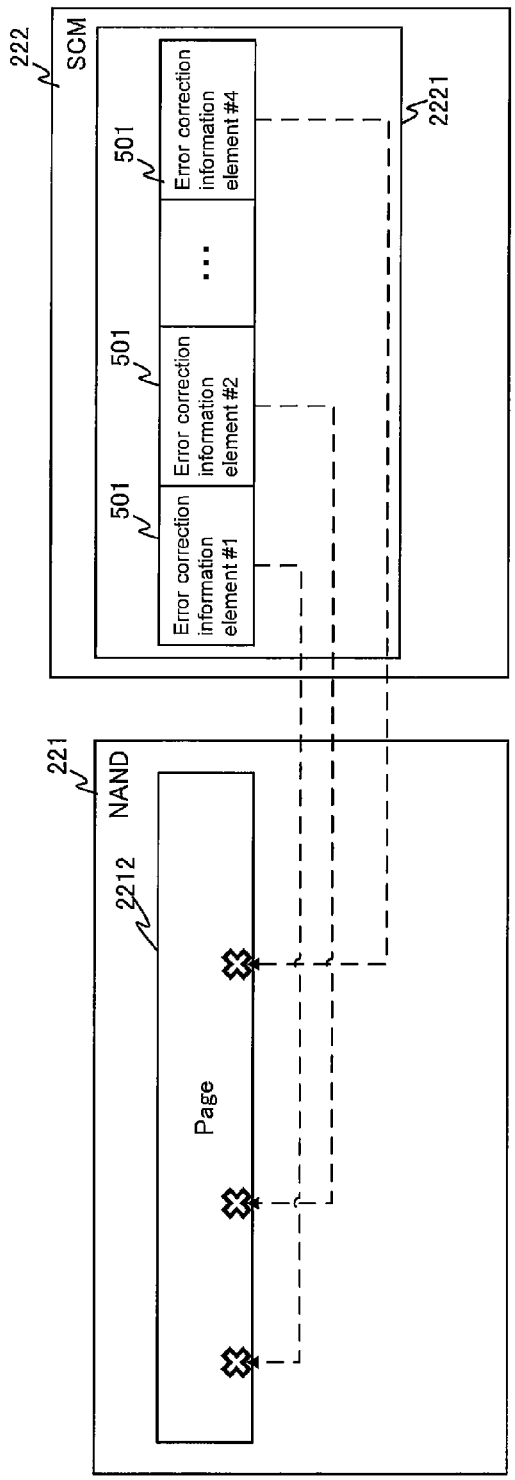
FIG. 6 is a schematic diagram explaining a relationship between a bit error of data stored in a NAND FM chip and an error correction information element stored in an SCM FM chip according to the first embodiment.

FIG. 6 is a schematic diagram explaining a relationship between a bit error of data stored in a NAND FM chip and an error correction information element stored in an SCM FM chip according to the first embodiment. White cross shown in the FIG. 6 indicates the occurrence of a bit error in data stored in a physical page 2212 of a NAND FM chip 221, as well as the location in the physical page 2212 where the bit error has occurred.

In the example shown in FIG. 6, one segment 2221 is mapped to one physical page 2212. In addition, one physical page 2212 is divided into multiple regions (CWs), in three of which CWs bit error has occurred. Thus, three error correction information elements 501 are stored in one segment 2221. That is, the locations of three bit errors that have occurred in the physical page 2212 are managed by the segment 2221 as three error correction information elements 501.

In the example shown in FIG. 6, the three bit errors occurring are managed by an error correction information element #1, an error correction information element #2, and an error correction information element #4, respectively. Dotted line shown in FIG. 6 indicates the correspondence between the bit errors occurring in the physical page 2212 and the error correction information elements 501. That is, a bit error on the left side of the physical page 2212 is stored in the error correction information element #1 as a bit error that has occurred in the region of the CW1, a bit error in the middle is stored in the error correction information element #2 as a bit error that has occurred in the region of the CW2, and a bit error on the right side is stored to the error correction information element #4 as a bit error that has occurred in the region of the CW4. In this case, since only one bit error has occurred in each CW, stored at a bit position 5022 of the positional information 502 of each error correction information element 501 indicating each bit error is in which bit of each of CW1, CW2 and CW4 a bit error has occurred.

Figure 7:
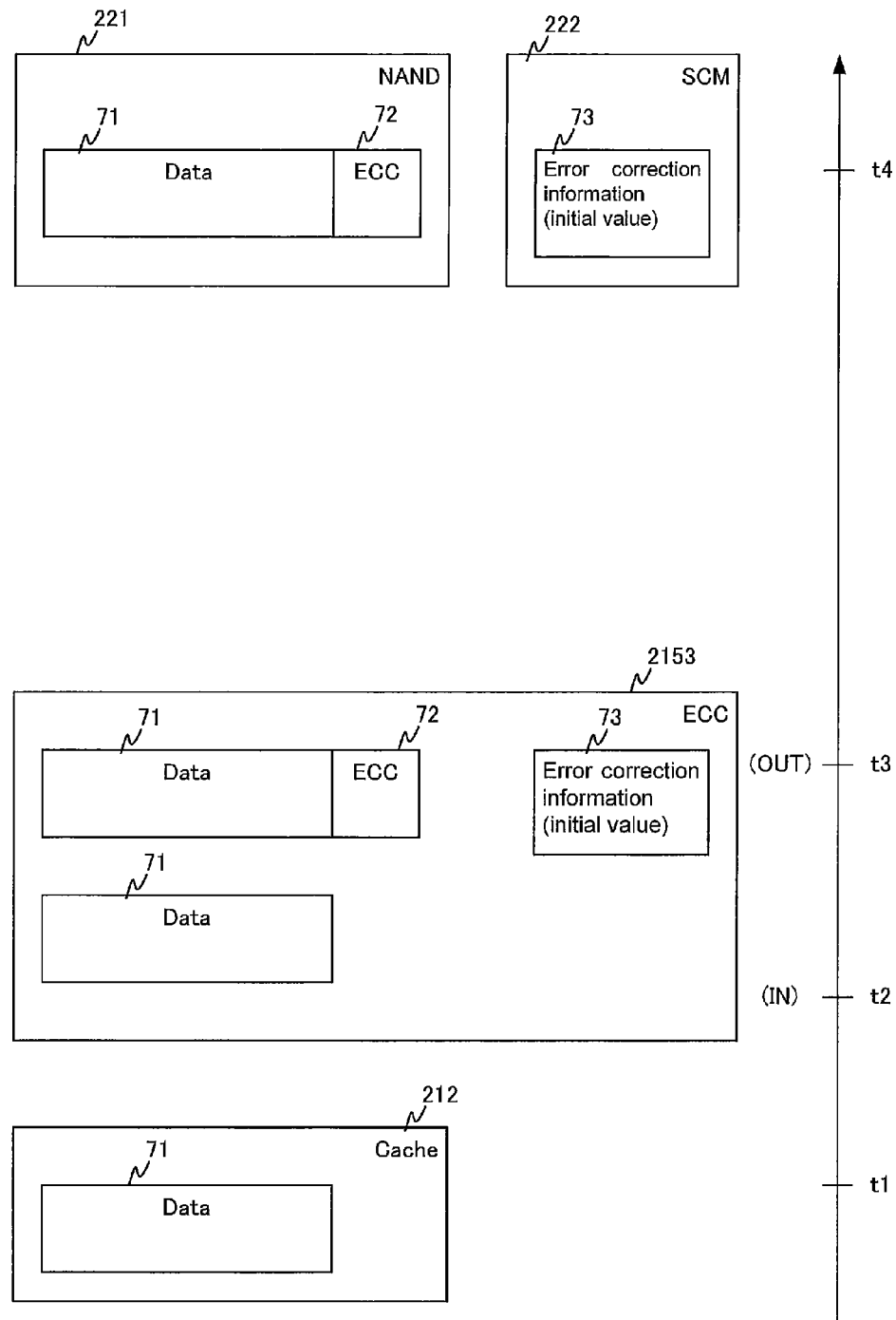
FIG. 7 is a schematic diagram explaining a flow of the first write process according to the first embodiment.
Figure 8:
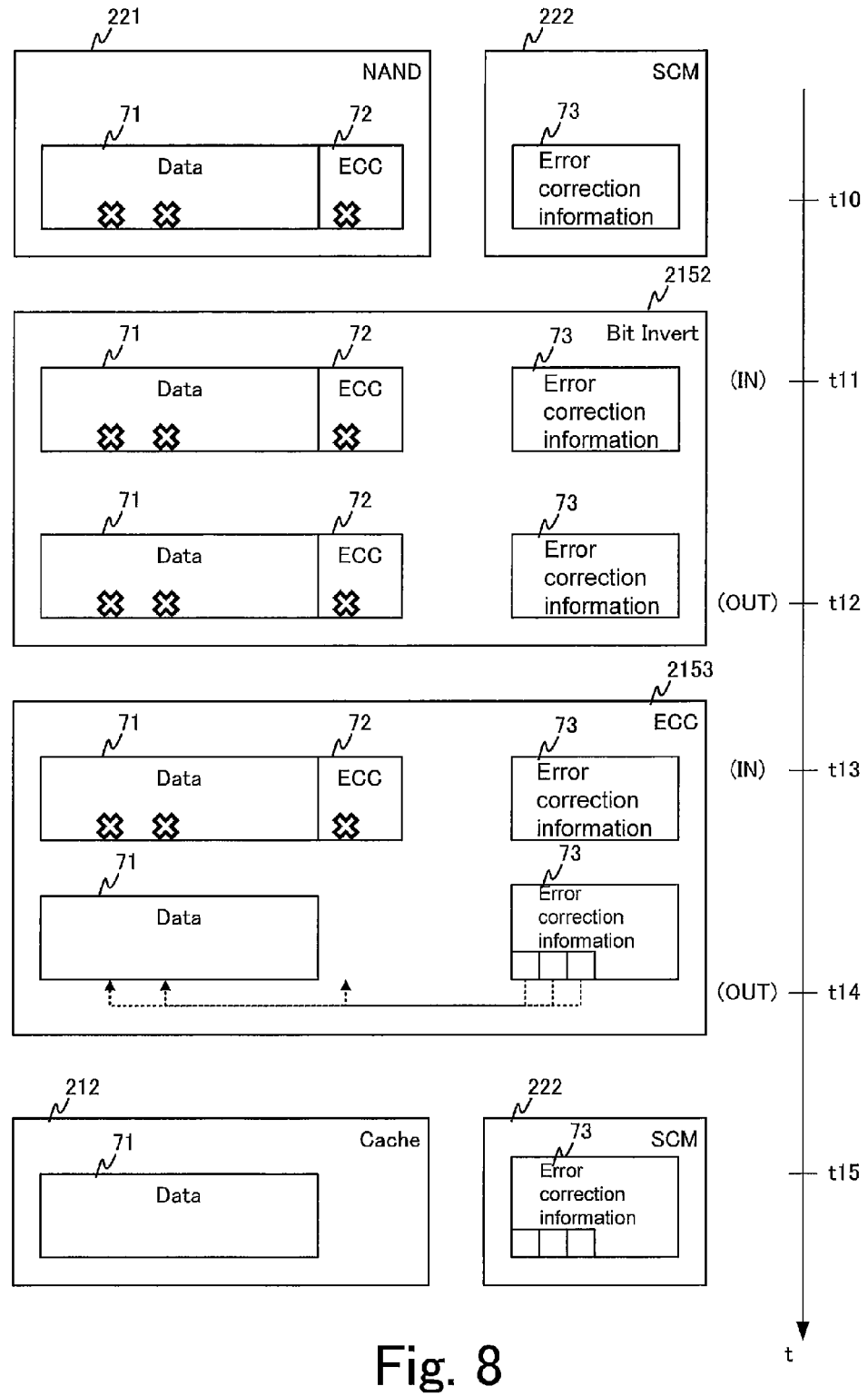
FIG. 8 is a schematic diagram explaining a read process at a first point in time according to the first embodiment.
Figure 9:
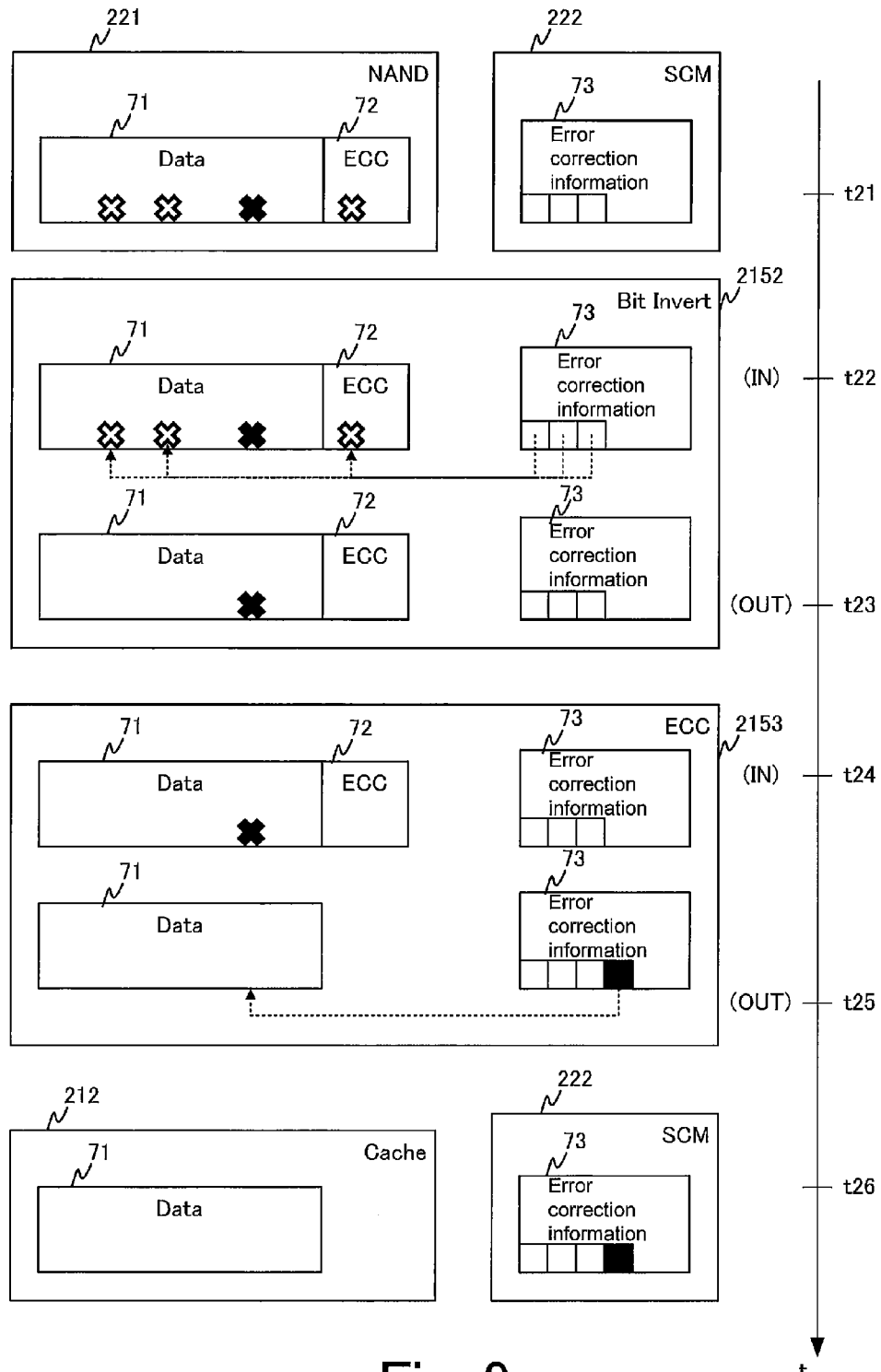
FIG. 9 is a schematic diagram explaining a read process at a second point in time according to the first embodiment.

Referring now to FIGS. 7-9, an overview of processes in this embodiment will be described below.

FIG. 7 is a schematic diagram explaining a flow of the first write process according to the first embodiment. As used herein, the first write process indicates a process where write data to be written is written to the SSD for the first time. As shown, time t progresses from bottom to top in FIG. 7.

Data 71 to be written, which is transmitted from the host computer 10, is stored in cache memory 212 by the FM controller 215 (at time t1). The data 71 stored in the cache memory 212 is DMA transferred by the DMA circuit 2151 to the ECC circuit 2153 (at time t2).

The ECC circuit 2153 generates an ECC 72 for the transferred data 71, as well as error correction information 73 relating to the data 71 and the ECC 72. The error correction information 73 is information about bit errors that have occurred in the data 71 and the ECC 72. The error correction information 73 includes, e.g., information about the number of bit errors that have occurred in the data 71 and the ECC 72, and information about the positions of bit errors that have occurred in the data 71 and the ECC 72. Since no bit error has occurred in the data 71 and the ECC 72 during the first write process, the ECC circuit 2153 generates an initial value (e.g., all zeros) as the error correction information 73.

The ECC circuit 2153 uses the DMA circuit 2151 to DMA transfer the data 71 and the ECC 72 to a NAND FM chip 221 and DMA transfer the error correction information 73 to the SCM FM chip 222 (at time t3).

The NAND controller 2213 of the NAND FM chip 221 stores the data 71 and the ECC 72 transferred from the ECC circuit 2153 in an empty physical page 2212 (at time t4). In addition, the SCM controller 2222 of the SCM FM chip 222 stores the error correction information 73 transferred from the ECC circuit 2153 in a segment 2221. In this case, the SCM controller 222 may store the error correction information 73 in an empty segment 2221, or overwrite a segment 2221 storing data with the error correction information 73.

In the following description, data transfers among the components (excluding those between the host computer 10 and the cache memory 212) are performed by the DMA circuit 2151. In such data transfers, however, the reference to "DMA circuit 2151" as the subject of data transfer will be omitted for simplicity and the data transfers will be described using each component as the subject instead. Incidentally, data transfers between the host computer 10 and the cache memory 212 are DMA transferred by the DMA circuit, which is held by a host I/F 213. Incidentally, some or all of the data transfers among the components may also be performed using PIO (Programmed I/O) transfer, rather than DMA transfer.

FIG. 8 is a schematic diagram explaining a read process at a first point in time according to the first embodiment. As shown, time t progresses from top to bottom in FIG. 8. As used herein, a read process at a first point in time represents a read process where an initial value is stored in error correction information of a SCM FM chip 222.

In the following description, it is assumed that three bit errors have been occurred throughout the data 71 and the ECC 72 that are stored in the NAND FM chip 221 by the write process of FIG. 7. The positions indicated by white cross in FIG. 7 represent the positions of bit errors in the data 71 and the ECC 72.

If a read command is issued by the host computer 10 for the data 71 stored in the NAND FM chip 221, then the data 71 and the ECC 72 are transferred from the NAND FM chip 221 to the bit inversion circuit 2152, and the error correction information 73 is transferred from the SCM FM 222 to the bit inversion circuit 2152 (at time t10).

The bit inversion circuit 2152 receives the data 71 and the ECC 72 as well as the error correction information 73 (at time t11). Next, based on the error correction information 73, the bit inversion circuit 2152 performs correction of bit errors occurring in the data 71 and the ECC 72. At this point, since the error correction information 73 is set to the initial value, the bit inversion circuit 2152 directly transfers the transferred data 71 and ECC 72 as well as the error correction information 73 to the ECC circuit 2153 (at time t12).

The ECC circuit 2153 receives the data 71 and the ECC 72 as well as the error correction information 73 (at time t13). Based on the ECC 72, the ECC circuit 2153 performs correction of bit errors occurring in the data 71 (correction of bit errors for three bits) (at time t14). At this point, the ECC circuit 2153 updates the error correction information 73 to information about the positions of the corrected bit errors (in this figure, three positions) and error correction information 73 containing a value of the corrected data (i.e., a value of the original data). In this case, for example, the ECC circuit 2153 updates the error correction information 73 by overwriting the initial value of the error correction information 73 generated at time t2 with information about the bit errors having occurred (having been corrected) (one or more data correction information elements (locations where the bit errors have occurred (positional information) and the values before the bit errors occurred)).

The ECC circuit 2153 transfers the corrected data 71 to the cache memory 212 and transfers the generated error correction information 73 to the SCM FM chip 222 (at time t14). Thereafter, the data 71 in accordance with the read command from the host computer 10 is stored in the cache memory 212 and the error correction information 73 is stored in the SCM FM chip 222 (at time t15). Subsequently, the data 71 stored in the cache memory 212 is transmitted to the host computer 10.

FIG. 9 is a schematic diagram explaining a read process at a second point in time according to the first embodiment. As shown, time t progresses from top to bottom in FIG. 9. As used herein, a read process at a second point in time indicates a read process following the storage of information about bit errors detected by the previous read process(es) in the error correction information 73 of the SCM FM chip 222.

In this case, it is assumed that in the read process at the second point in time, the information about the bit errors for three bits that is generated during the read process at the first point in time is included in the error correction information 73, and that a certain time has passed since the data 71 and the ECC 72 were stored and another one bit error has been added to the data 71 and the ECC 72. In addition, white cross indicates the previously-occurred bit errors (the bit errors that had already been ascertained by the ECC circuit 2153 during the first read), while black cross indicates the newly-occurred bit error (the bit error that occurred subsequent to the read process at the first point in time).

If a read command is issued by the host computer 10 to the SSD 20 for the data 71 stored in the NAND FM chip 221, then the data 71 and the ECC 72 are transferred from the NAND FM chip 221 to the bit inversion circuit 2152, and the error correction information 73 is transferred from the SCM FM chip 222 to the bit inversion circuit 2152 (at time t21). At this point, the information about the bit errors for three bits (three data correction information elements 501) that is generated by the ECC circuit 2153 during the read process at the first point in time is included in the error correction information 73.

The bit inversion circuit 2152 receives the data 71 and the ECC 72 as well as the error correction information 73 (at time t22). Next, based on the error correction information 73, the bit inversion circuit 2152 performs correction of bit errors occurring in the data 71 and the ECC 72. At this point, since the error correction information 73 contains the information about the bit errors for three bits that was generated during the read process at the first point in time, the bit inversion circuit 2152 performs, based on this error correction information 73, correction of the bit errors for three bits that were identified during the read process at the first point in time. As a result, the three bit errors in the data 71 indicated by white cross are corrected. Then, the bit inversion circuit 2152 transfers the corrected data 71 and the ECC 72 as well as the error correction information 73 containing the information about the bit errors for three bits to the ECC circuit 2153 (at time t23).

Based on the ECC 72, the ECC circuit 2153 performs correction of bit errors occurring in the data 71 (correction of a bit error for one bit) (at time t24). At this point, the ECC circuit 2153 adds the error correction information element 501 including the location of the corrected bit error (the bit error indicated by black cross) and a value of the corrected data (a value of the original data) to the error correction information 73.

As a result, included in the error correction information 73 are information about the bit errors for three bits that had occurred at the time of the read process at the first point in time and information about the bit error for one bit that occurred additionally at the time of the read process at the second point in time, i.e., information about the bit errors for a total of four bits (error correction information elements).

Then, the ECC circuit 2153 transfers the corrected data 71 to the cache memory 212 and transfers the error correction information 73 to the SCM FM chip 222 (at time t25).

The transferred corrected data 71 is stored in the cache memory 212. In addition, the transferred error correction information 73 is stored in the SCM FM chip 222 (at time t26). Subsequently, the data 71 stored in the cache memory 212 is transmitted to the host computer 10.

In this way, in the read process at the second point in time, the data 71 and the ECC 72 read from the NAND FM chip 221 are subjected to a first stage correction of error bits at the bit inversion circuit 2152 based on the error correction information 73 read from the SCM FM chip 222. Next, the data 71 and the ECC 72 subjected to the first stage correction is transferred to the ECC circuit 2153. At this point, since the bit errors are corrected by the bit inversion circuit 2152, the data 71 and the ECC 72 with reduced bit errors are transferred from the bit inversion circuit 2152 to the ECC circuit 2153. Then, at the ECC circuit 2153, the transferred data 71 and ECC 72 are subjected to a second stage correction of bit errors based on the ECC 72.

Accordingly, even if the number of bit errors that are present in the data 71 and the ECC 72 read from the NAND FM chip 221 exceeds the number of bit errors that can be corrected (hereinafter, the correctable limit number) by the ECC circuit 2153 with the ECC 72 at the time when the data 71 and the ECC 72 are read from the NAND FM chip 221, the inversion circuit 2152 may perform a first stage correction of error bits so that the number of bit errors cannot exceed the correctable limit number. Consequently, the SSD 20 may correct a number of error bits that is equal to or larger than the correctable limit number provided by the ECC circuit 2153 of the NAND FM chip 221.

The error correction information 73, which is stored in the SCM FM chip 222, is transferred to the bit inversion circuit 2152 when the SSD 20 receives a read command from the host computer 10. That is, in this embodiment, it is possible to increase the number of error bits that can be corrected without changing the data size of the ECC 72 provided to the data 71 (e.g., without a group of data including the data 71 and the ECC 72 spanning across two pages). Therefore, this embodiment may prolong the lifetime of the NAND FM chip 222 and the lifetime of the entire SSD 20, without compromising response performance.

Incidentally, for example, the error correction information 73 is transferred from the SCM FM chip 222 to the bit inversion circuit 2152 every time a read command is received from the host computer 10. However, since the SCM FM chip 222 achieves fast response speed for read/write as mentioned above, for example, the response speed of the entire SSD 20 to the host computer 10 cannot be reduced.

Referring now to FIGS. 10-15, a specific structure of the SSD according to the first embodiment will be described below.

Figure 10:
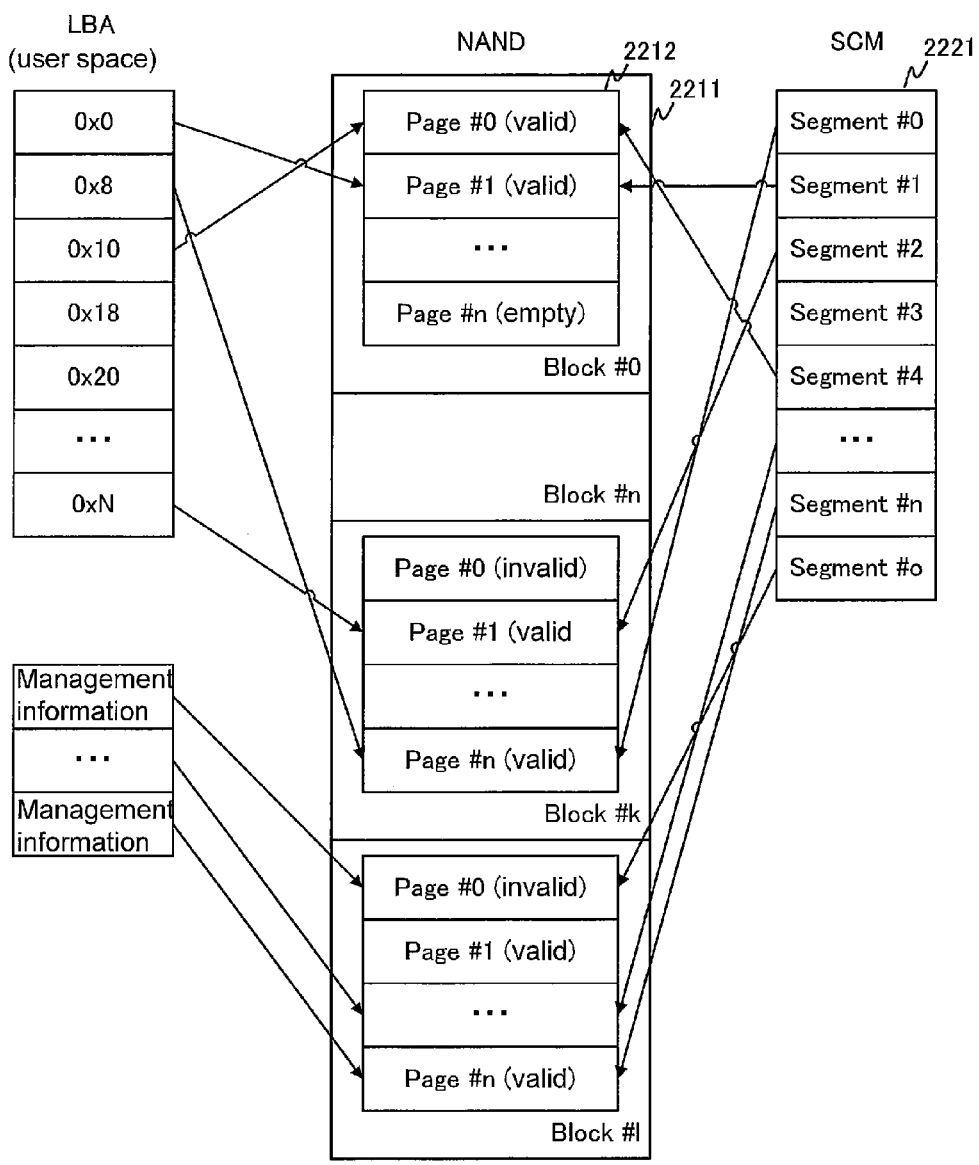
FIG. 10 is a schematic diagram explaining the correspondence between a physical page and a segment according to the first embodiment.

FIG. 10 is a schematic diagram explaining the correspondence between a physical page and a segment according to the first embodiment.

Each LBA (Logical Block Address), which indicates a logical page in a logical volume (e.g., 8 KB) recognized by the host computer 10, is mapped to a physical page 2212 of the NAND FM chip 221 in a one-to-one relationship. In FIG. 10, the overall physical space formed by the physical page 2212 of the NAND FM chip 221 is shown larger than the overall physical space formed by the LBA space.

In this embodiment, the physical page 2212 of the NAND FM chip 221 and the segment 2221 of the SCM FM chip 222 are mapped to each other in a one-to-one relationship. Incidentally, the physical page 2212 and the segment 2221 may not be mapped to each other. The correspondence relationship between the LBA (logical page) and the physical page 2212 as well as the correspondence relationship between the physical page 2212 and the segment 2221 are managed using an address conversion table 1122, which will be described later.

When an update request is issued by the host computer 10 for the data stored in the NAND FM chip 221, the same storage area may not be overwritten with data in the NAND FM chip 221. Thus, the FM controller 215 removes the correspondence between the LBA and the physical page storing the data before updating (hereinafter, a old physical page) to map a new physical page to the LBA. Then, the FM controller 215 stores the data in accordance with the update request in the mapped new physical page. Further, the FM controller 215 maps the segment that had been previously mapped to the old physical page to a new physical page. That is, upon receipt of an update request from the host computer 10, the FM controller 215 changes the mapping of the physical page 2212 and the segment 2221 to the LBA by changing entries (LBA 1201, Page #1204, and Segment #1205) in the address conversion table 1122, which will be described below.

For example, the management information shown in the FIG. 10 is an address conversion table 1122. While the address conversion table 1122 may be stored in the NAND FM chip 221, it may also be stored in the SCM FM chip 222. Because of its fast response times to read/write and high durability, the SCM FM chip 222 may also be used as an alternative to the cache memory 212.

Figures 11, 12:
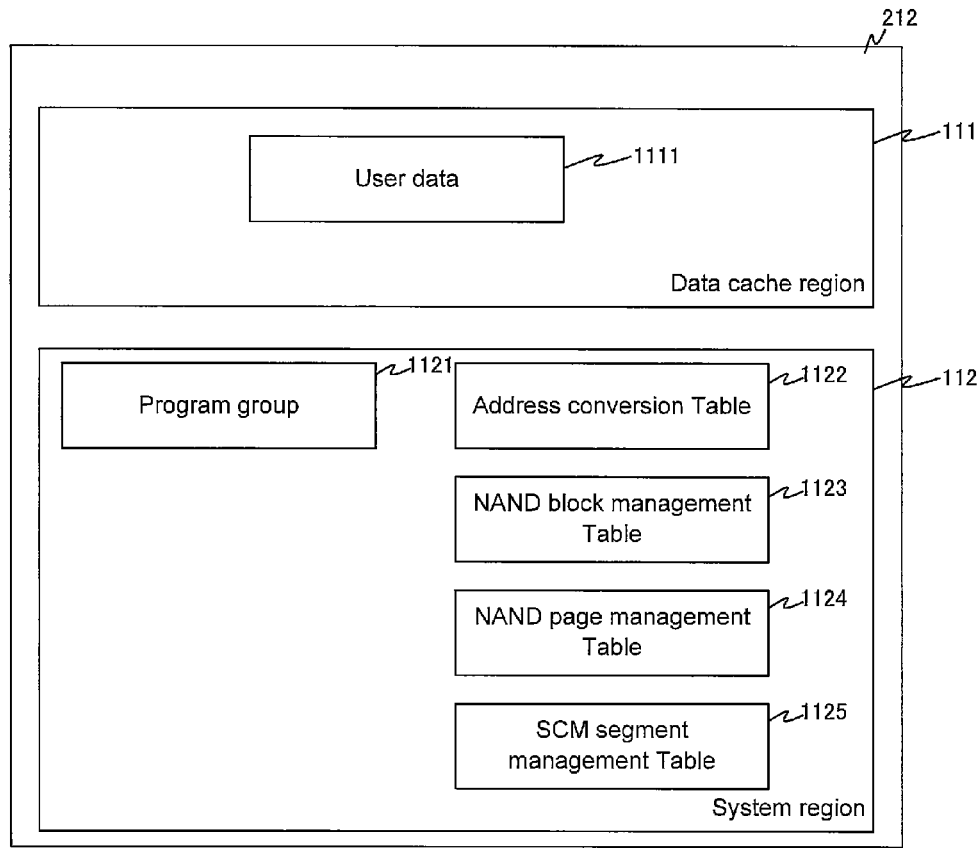
FIG. 11 is a diagram showing an example of the structure of cache memory according to the first embodiment.
FIG. 12 is a diagram showing an example of an address conversion table according to the first embodiment.

FIG. 11 is a diagram showing an example of the structure of cache memory according to the first embodiment.

The cache memory 212 includes a data cache region 111 and a system region 112.

For example, the data cache region 111 is a region for temporarily storing data (user data) 1111 in accordance with a read/write command from the host computer 10.

The system region 112 stores a group of program 1121 and a group of tables (1122-1125) for controlling the SSD 20. The group of tables includes, e.g., an address conversion table 1122, a NAND block management table (block management table) 1123, a NAND page management table (page management table) 1124, and an SCM segment management table (segment management table) 1125.

FIG. 12 is a diagram showing an example of an address conversion table according to the first embodiment.

The address conversion table 1122 is a table for managing information indicating which physical pages of the NAND FM chip 221 are mapped to respective LBAs, and information indicating which segments of the SCM FM chip 222 are mapped to respective physical pages.

The address conversion table 1122 stores, for each LBA, entries, each containing LBA 1201, FM #1202, Block #1203, Physical Page #1204, and Segment #1205.

LBA 1201 is information (LBA) indicating the position of a logical page in the logical space (LU (Logical Unit)) provided for the host computer 10. Incidentally, the host computer 10 transmits to the SSD 20 an I/O command specified the number indicative of the LU and the LBA 1201 . . . FM #1202 is information for identifying a flash memory chip (221, 222) of the SSD 20 that contains a block corresponding to an LBA. Block #1203 is information for identifying a block corresponding to the LBA in the NAND FM chip 221. Physical Page #1204 is information for identifying a physical page in the block corresponding to the LBA. Segment #1205 is information for identifying a segment of the SCM FM chip 222 corresponding to the physical page of the Physical Page #1204.

FIG. 13 is a diagram showing an example of a block management table according to the first embodiment.

The block management table 1123 manages information about blocks contained in the NAND FM chip 221. The block management table 1123 stores, for each NAND FM chip 221, entries, each containing FM #1301, Block #1302, Attribute 1303, Erase Times 1304, and Number of Valid Pages 1305.

FM #1301 is information for identifying a NAND FM chip 221. Block #1302 is information for identifying a block contained in the NAND FM chip 221 that is indicated by FM #1301.

Attribute 1303 is information indicating attributes of the block of Block #1302 of the same entry. For example, the attributes of the block includes "Empty", "In-use" and "N". "Empty" represents a block where data stored in that block had been erased, and thereafter none of the physical pages contained in that block have been mapped to an LBA. In addition, "In-use" represents a block where data has been stored in any or all of the physical pages contained in that block (including valid and invalid pages). In addition, "N" represents a block where data has never been stored in any of the physical pages contained in that block.

Erase times 1304 is information for indicating the number of times data is erased in the block of Block #1302 of the same entry. Larger values of Erase Times 1304 represent shorter periods of time in which data can be stored. That is, Erase Times 1304 is information about the lifetime of a flash memory chip. Number of Valid Pages 1305 is information for indicating the total number of physical pages that store valid data among those physical pages that are contained in the block of Block #1302 of the same entry.

For example, when performing a reclamation process, it is better to perform the reclamation process on a block with a smaller value of Erase Times 1304 and a smaller value of Number of Valid Pages 1305. This is because as reclamation process involves a process for moving data stored in a valid page to another block, the amount of data to be copied can be reduced if there is less data to be moved, thereby retaining the performance of the SSD 20.

FIG. 14 is a diagram showing an example of a page management table according to the first embodiment.

The page management table 1124 manages information about physical pages contained in the NAND FM chip 221. The page management table 1124 stores, for each NAND FM chip 221, entries, each containing FM #1401, Block #1402, Physical Page #1403, Page Attribute 1404, and Number of Bit Errors Occurred 1405.

FM #1401 is information for identifying a NAND FM chip 221 contained in the SSD 20. Block #1402 is information for identifying a block contained in the NAND FM chip 221 of FM #1401 of the same entry. Physical Page #1403 is information for identifying a physical page contained in the block of Block #1402 of the same entry.

Page Attribute 1404 is information indicating attributes of the physical page of Physical Page #1403 of the same entry. For example, the attributes of the physical page includes "Valid," "Invalid" and "Empty". "Valid" represents a physical page in which the latest data is stored, i.e., a physical page that is mapped to an LBA. In addition, "Invalid" represents a physical page that is not mapped to an LBA and in which old data is stored. In addition, "Empty" represents a physical page that is not mapped to an LBA and in which no data is stored, or from which data is erased. Incidentally, when Attribute 1404 of all of the physical pages contained in a block turns to "Empty," Attribute 1303 (see FIG. 13) of that block turns to "Empty."

Number of Bit Errors Occurred 1405 represents information about bit errors that have occurred in a physical page of Physical Page #1403 of the same entry. For example, Number of Bit Errors Occurred 1405 contains Total 14051 and CW#0 to CW#N (14052 to 14054). The number of bit errors that have occurred in a physical page is managed for each CW, which is obtained by dividing the physical page into a predetermined number of parts. Total 14051 is information indicating the total number of bit errors that have occurred in the physical page of Physical Page #1403 of the same entry. Each CW#(14052-14054) is information indicating the number of bit errors that have occurred in each region (CW), which is obtained by dividing the physical page into a predetermined number of logically.

FIG. 15 is a diagram showing an example of a segment management table according to the first embodiment.

The segment management table 125 manages, for each segment contained in a SCM FM chip 222, entries, each containing Segment #1501, Start Address 1502, Last Address 1503, Attribute 1504, and Number of Error Correction Information Elements Stored 1505.

Segment #1501 is information for identifying a segment contained in a storage region of the SCM FM chip 222. Start Address 1502 represents the start address of a storage region allocated to the segment corresponding to Segment #1501 of the same entry. Last Address 1503 represents the last address of a storage region allocated to the segment corresponding to Segment #1501 of the same entry.

Attribute 1504 is information indicating attributes of the segment of Segment #1501 of the same entry. For example, the attributes of the segment includes "Valid" and "Invalid". "Invalid" represents a segment that is not mapped to a physical page of the NAND FM chip 221. "Valid" represents a segment that is mapped to the physical page of the NAND FM chip 221 and in which error correction information is stored. Number of Error Correction Information Elements Stored 1505 is information indicating how many bits of bit errors are stored in the segment of Segment #1501 of the same entry. If error correction information is stored in a segment, but the stored information is set to the initial value (e.g., all zeros), "0" is stored in Number of Error Correction Information Elements Stored 1505. That is, if Attribute 1504 is "Valid" and if Number of Error Correction Information Elements Stored 1505 is "0," this indicates that the data stored in the NAND FM chip 221 is read at a first point in time (a point in time when no bit error has been detected). In this embodiment, in a read process after a second point in time (a point in time when a bit error has been detected), a value other than "0" is stored in Number of Error Correction Information Elements Stored 1505.

Next, a process flow in this embodiment will be described below.

Figure 16:
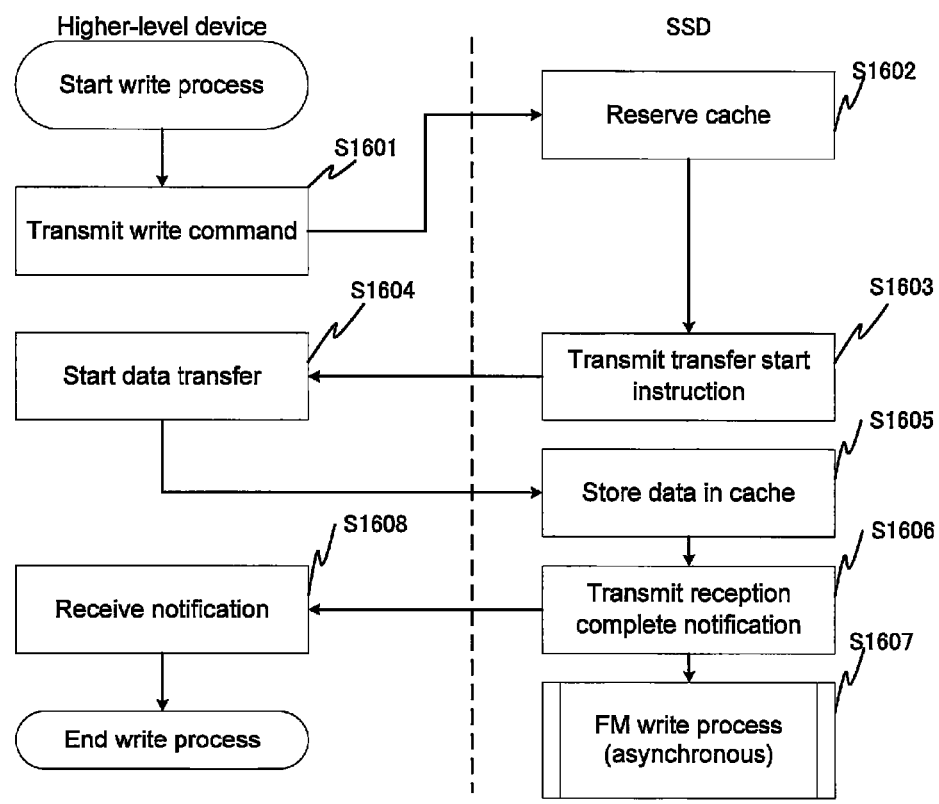
FIG. 16 is a flow chart including a write process of the SSD in response to a write command from the host computer according to the first embodiment.

FIG. 16 is a flow chart including a write process of the SSD in response to a write command from the host computer according to the first embodiment.

The host computer 10 transmits a write command to the SSD 20 (S1601). The SSD 20 receives the write command issued from the host computer 10 and reserves a region corresponding to the volume of data in accordance with the write command in cache memory 212 (S1602). If the region can be reserved in the cache memory 212, then the SSD 20 transmits an instruction to the host computer 10 to start transmission of the data in accordance with the write command (hereinafter, write data) (S1603).

Upon receipt of the instruction to start transmission of write data from the SSD 20, the host computer 10 starts transmission of the write data to the SSD 20 (S1604).

The SSD 20 stores the write data transmitted from the host computer 10 to the cache memory 212 (S1605). Then, upon completion of receiving the write data, the SSD 20 transmits a data reception complete notification to the host computer 10 to inform that the receipt of the write data has been completed (S1606). Thereafter, the SSD 20 reserves a physical page in the NAND FM chip 221, and then performs a flash memory write process (see FIG. 18) for writing the write data stored in the cache memory 212 to the reserved physical page (S1607). On the other hand, upon receipt of the data reception complete notification, the host computer 10 terminates the write process (S1608).

Incidentally, the data reception complete notification of S1606 may also be transmitted after the SSD 20 writes the write data from the host computer 10 to the physical page.

Figure 17:
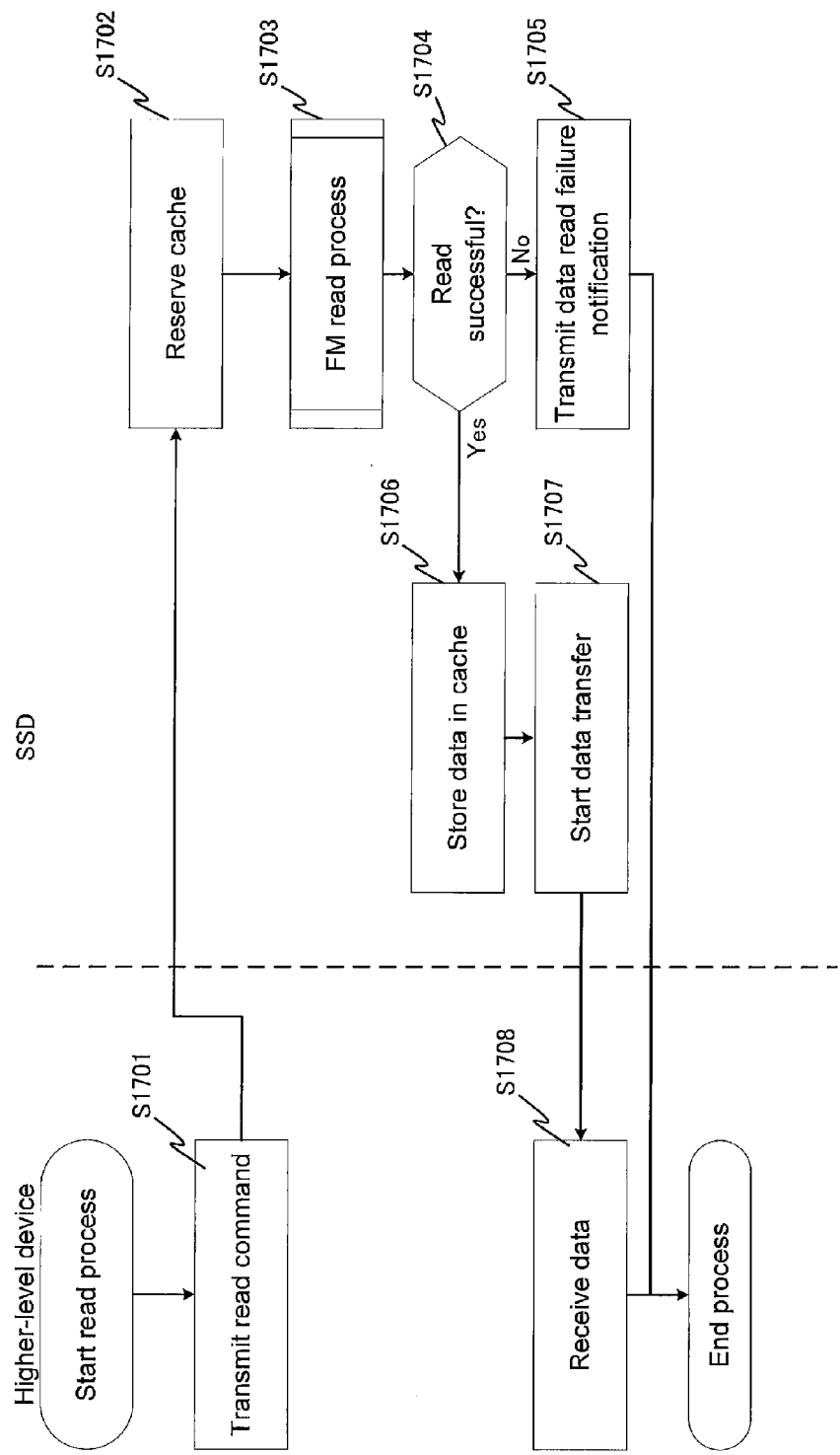
FIG. 17 is a flow chart including a read process of the SSD in response to a read command from the host computer according to the first embodiment.

FIG. 17 is a flow chart including a read process of the SSD in response to a read command from the host computer according to the first embodiment.

The host computer 10 transmits a read command to the SSD 20 (S1701). The SSD 20 receives a read command issued from the host computer 10 and reserves a region corresponding to the volume of data in accordance with a read command in the cache memory 212 (S1702). If the region can be reserved in the cache memory 212, the SSD 20 starts a read process (see FIG. 20) to read the data in accordance with the read command (hereinafter, read data) from a physical page of the NAND FM chip 221 (S1703).

If the read data cannot be read (S1704: "No"), then the SSD 20 transmits to the host computer 10 a data read failure notification that the read data has failed to be read (S1705). As used herein, a case where the data cannot be read represents a case where, at the time of reading from a physical page the read data and an ECC stored with the read data (hereinafter, a group of data), bit errors have occurred in some of the bits included in the group of data, but not all of the bit errors can be corrected either by the bit inversion circuit 2152 or the ECC circuit 2153, i.e., where uncorrectable errors have occurred. Incidentally, upon receipt of the data read failure notification, the host computer 10 terminates the read process.

Alternatively, if the read data can be read, (S1704: "Yes"), then the SSD 20 stores the read data in the cache memory 212 (S1706). As used herein, a case where the read data can be read represents a case where no bit error is occurring in the read data, or where some bit errors have previously occurred in the read data, but all of these bit errors in the read data have already been corrected successfully by the bit inversion circuit 2152 and the ECC circuit 2153.

The SSD 20 starts transmission of the read data stored in the cache memory 212 to the host computer 10 (S1707). The host computer 10 receives the read data transmitted from the SSD 20 (S1708). After having received all of the read data, the host computer 10 terminates the read process.

Figure 18:
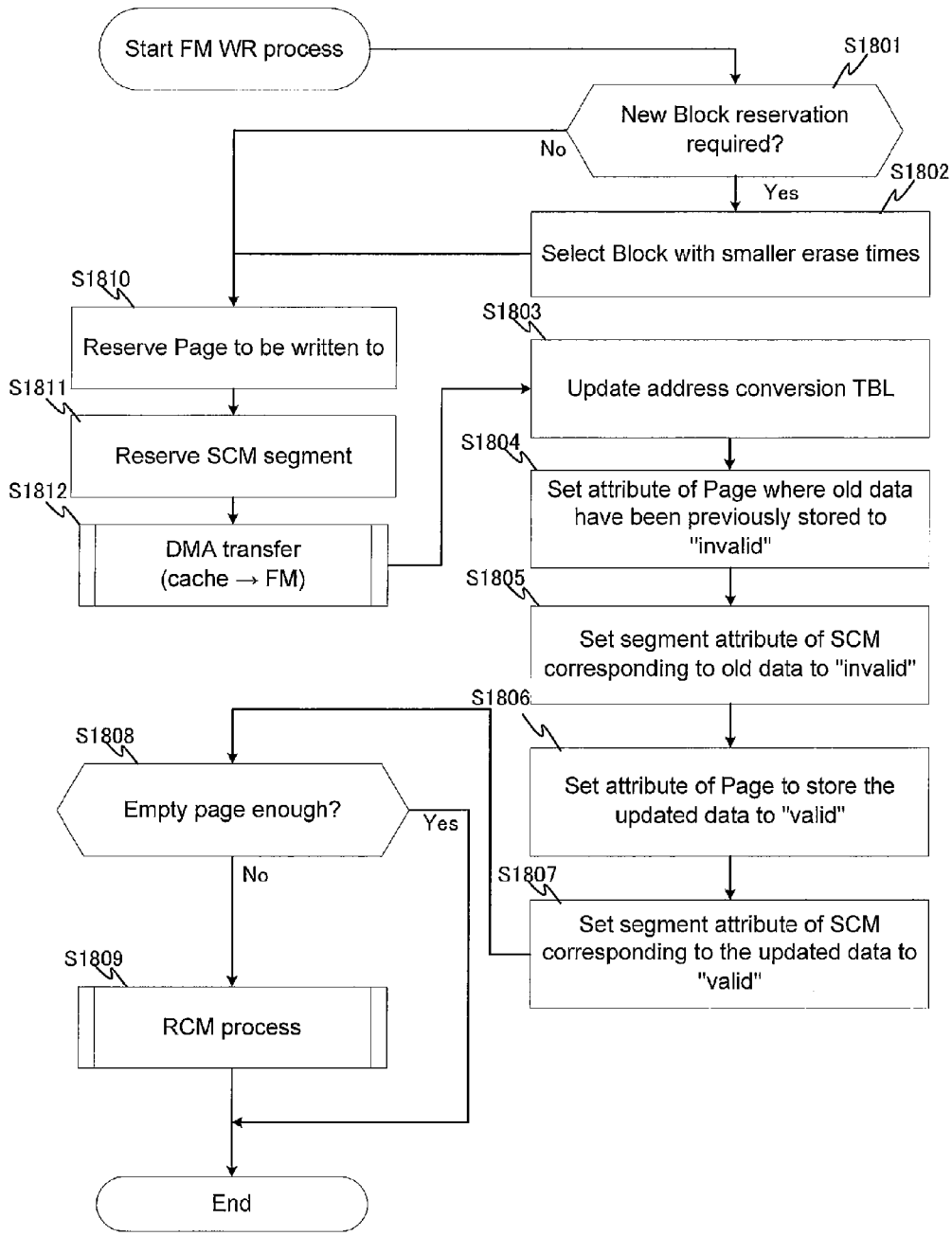
FIG. 18 is a flow chart of a flash memory write process according to the first embodiment.

FIG. 18 is a flow chart of a flash memory write process according to the first embodiment.

A flash memory write process includes a process for newly writing data to the NAND FM chip 221 and a write process associated with data update. Unless otherwise specifically distinguished, data on which these processes are performed will be simply referred to as data. For a write process associated with data update, newly updated data will be referred to as new data, while data before being updated will be referred to as old data. In addition, a physical page where old data has been previously stored will be referred to as an old physical page, while a physical page where new data is to be stored will be referred to as a new physical page.

The flash memory write process is a process corresponding to S1607 of FIG. 16. In order to write data, the FM controller 215 determines whether it is required to reserve a new block among those blocks contained in the NAND FM chip 221 (S1801). For example, the process of S1801 is a process for making priority use of an already-used block.

Alternatively, if it is not required to reserve a new block (S1801: "No"), i.e., if there is an already-used block (a block which contains a physical page storing data), then physical pages for the volume for writing write data in the cache memory 212 are reserved among those physical pages in the block where no data is stored (unused physical pages) (S1810). At this point, the FM controller 215 makes reservation of unused physical pages in order of increasing address numbers.

Next, the FM controller 215 reserves segments to be mapped to the physical pages from the SCM FM chip 222 (S1811). Incidentally, for example, if data stored in a physical page is of low importance and thus there is no need to map a segment to the physical page, then the process of S1811 may be omitted.

Then, the DMA circuit 2151 of the FM controller 215 performs a DMA transfer process from the cache to the flash memory (see FIG. 19) for transferring data in the cache memory 212 to the reserved physical page of the NAND FM chip 221 (S1812). As the result of this DMA transfer process from the cache to the flash memory, data in the cache memory 212 is written to the reserved physical page.

If it is required to reserve a new block (S1801: "Yes"), i.e., if there is no already-used block, then the FM controller 215 refers to the block management table 1123 for Erase Times 1304 to select an unused block with less erase times (a block without a physical page storing data) (S1802). Thereafter, the FM controller 215 carries out the process of S1810-S1812. In the process of S1810, the FM controller 215 reserves physical pages in order, starting from the physical page at the beginning of the unused block.

After having finished the process of S1812, the FM controller 215 updates the address conversion table 1122 (S1803). Specifically, the FM controller 215 maps the new physical page in which data has been stored to an LBA 1201 which is an object of a write process. More specifically, the FM controller 215 updates the value of Physical Page #1204 corresponding to the LBA 1201 with a value to identify the new physical page.

Next, the FM controller 215 configures Page Attribute 1404 of the entry corresponding to the physical page where old data has been previously stored as "Invalid" in the page management table 1124 (S1804). Next, the FM controller 215 configures Attribute 1504 of the segment of the entry corresponding to an old physical page as "Invalid" in the segment management table 1125 (S1805).

Next, in the page management table 1124, the FM controller 215 configures Page Attribute 1404 of the entry corresponding to the physical page storing new data as "Valid" (S1806). Next, the FM controller 215 maps, to a new physical page, a segment that is to be mapped to the new physical page, i.e., that has been previously mapped to an old physical page, and configures Attribute 1504 of the entry corresponding to this segment as "Valid" in the segment management table 1125 (S1807).

Next, the FM controller 215 checks whether the number of unused physical pages where new data will be stored is equal to or larger than a predetermined threshold (S1808). If the number of unused physical pages is equal to or larger that the predetermined threshold (S1808: "Yes"), then the FM controller 215 terminates the flash memory write process. Alternatively, if the number of unused physical pages is neither equal to nor larger than the predetermined threshold (S1808: "No"), then the FM controller 215 performs a reclamation process (RCM process, see FIG. 22) on the block storing the new data (S1809), and then terminates the flash memory write process.

Figure 19:
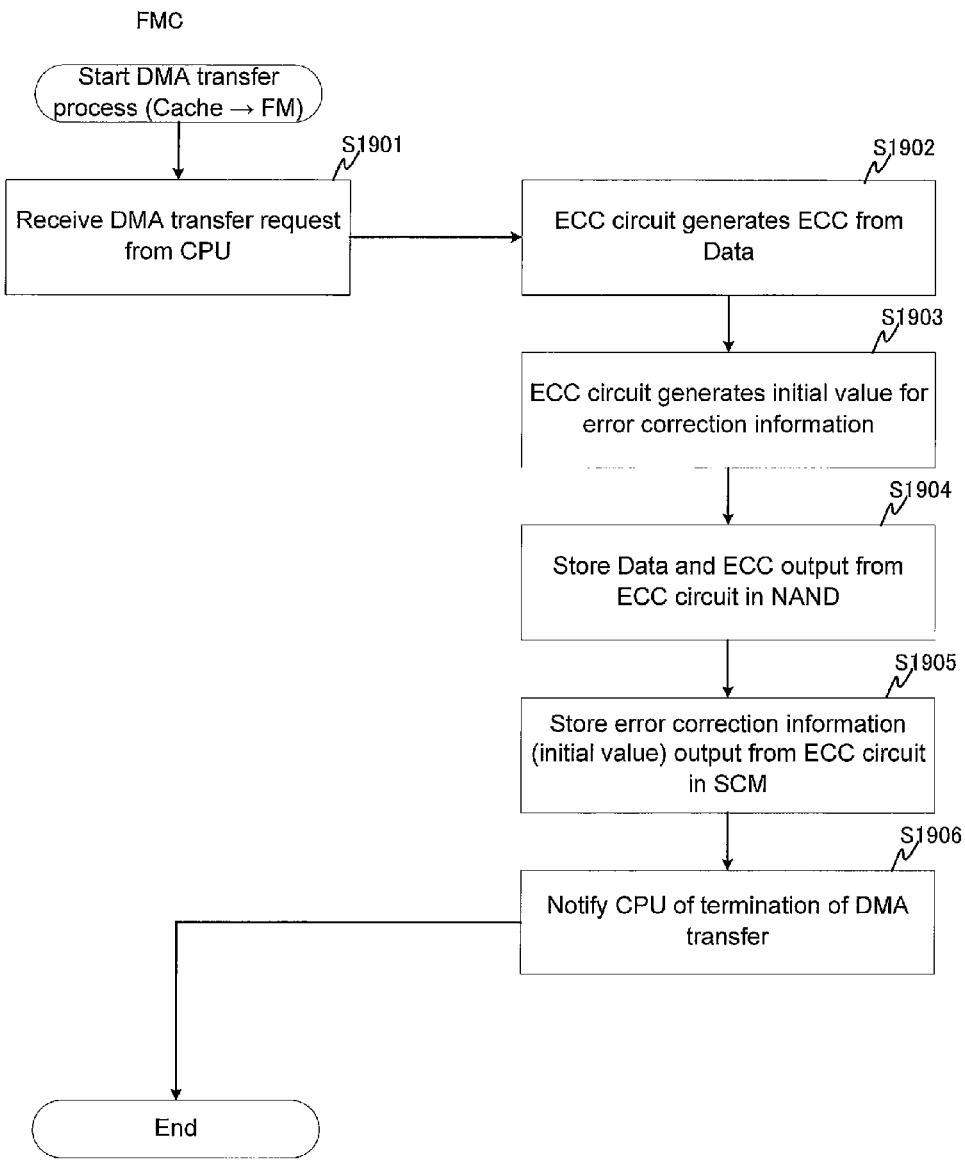
FIG. 19 is a flow chart of a DMA transfer process from the cache to an FM chip according to the first embodiment.

FIG. 19 is a flow chart of a DMA transfer process from a cache to an FM chip according to the first embodiment. This DMA transfer process is a process corresponding to S1812 of FIG. 18.

Upon receipt of an instruction from CPU 211 to DMA transfer data stored in the cache memory 212 to the NAND FM chip 221, the DMA circuit 2151 transfers the data stored in the cache memory 212 to the ECC circuit 2153 (S1901). The ECC circuit 2153 generates an ECC for the data transmitted from the DMA circuit 2151 (S1902), and generates an initial value (e.g., all zeros) of error correction information for the data transmitted from the DMA circuit 2151 (S1903). The ECC circuit 2153 transfers the data and the generated ECC to the NAND FM chip 221. The NAND controller 2213 of the NAND FM chip 221 stores the data and the ECC transferred from the ECC circuit 2153 (S1904).

In addition, the ECC circuit 2153 transfers the generated error correction information to the SCM FM chip 222. The SCM controller 2222 of the SCM FM chip 222 stores the error correction information transferred from the ECC circuit 2153 (S1905).

Thereafter, the DMA circuit 2151 notifies the CPU 211 of the termination of the DMA transfer (S1906), and then terminates the DMA transfer process.

Figure 20:
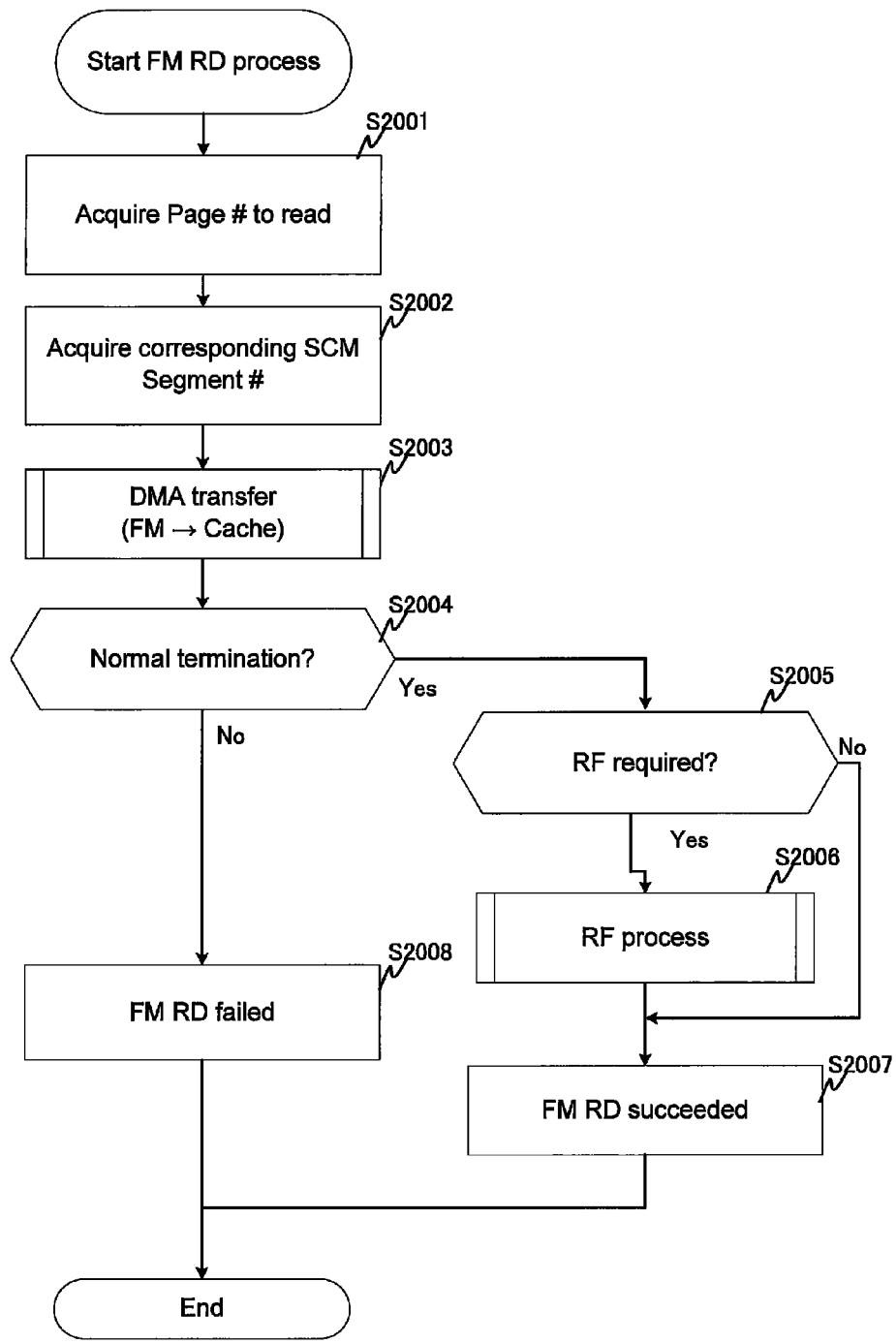
FIG. 20 is a flow chart of a flash memory read process according to the first embodiment.

FIG. 20 is a flow chart of a flash memory read process according to the first embodiment. This flash memory read process is a process corresponding to S1703 of FIG. 17.

The FM controller 215 refers to the address conversion table 1122 for Physical Page #1204 to acquire information about a physical page storing the data to be read in accordance with a read command (hereinafter, read data), i.e., Physical Page # to read (S2001). Then, the FM controller 215 refers to the address conversion table 1122 for Segment #1205 to acquire information (Segment #) about a segment mapped to the physical page storing the data to be read in accordance with the read command (S2002).

Next, the FM controller 215 causes the DMA circuit 2151 to perform a process for transferring the read data and the ECC from the physical page of Physical Page # identified at S2001 to the cache memory 212, a DMA transfer process from the flash memory to the cache memory (see FIG. 21) (S2003).

Thereafter, the FM controller 215 checks whether the read data has not been read normally (S2004). As used herein, the phrase "checks whether the read data has been read successfully" means for example that the FM controller 215 checks whether not all of the bit errors in the read data and the ECC read from the physical page have been corrected by the bit inversion circuit 2152 and the ECC circuit 2153.

If the read data has not been read successfully (S2004: "No"), then the FM controller 215 transmits a flash memory read failure notification to the host computer 10 to inform that the read process failed (S2008), and then terminates the flash memory read process.

Alternatively, if the read data has been read successfully (S2004: "Yes"), then the FM controller 215 checks whether a refresh process (RF process) is required (S2005). It is not preferable if all of the bit errors in the data read from the physical page have been corrected successfully by the bit inversion circuit 2152 and the ECC circuit 2153, but there had been a large number of bit errors in the data at the time of reading from the physical page. As such, when there are a large number of bit errors in the read data, the FM controller 215 determines that a refresh process is necessary to write this read data to another physical page.

For example, whether to perform a refresh process on a block is determined by, e.g., whether the block is a block that contains a physical page with Number of Bit Errors Occurred 1405 equal to or larger than a predetermined threshold, while referring to Number of Bit Errors Occurred 1405 in the page management table 1124. Specifically, for example, at a stage where the DMA circuit 2151 reads the data and the ECC from the physical page, the total number of bit errors for each of the CWs indicated by CW#14052-14054 is compared against the threshold defined by the CPU 211 for each of the CWs indicated by CW#14052-14054, and if the total number of bit errors exceeds the threshold, then a block that contains the physical page storing that data is considered as the block to be refreshed.

As a result, if it is determined that a refresh process is required (S2005: "Yes"), then the FM controller 215 performs a refresh process (see FIG. 23) on the physical page to be refreshed (S2006), followed by transmitting a flash memory read success notification including the read data to the host computer 10 (S2007), and terminating the flash memory read process. Alternatively, if it is determined that a refresh process is not required (S2005: "No"), then the FM controller 215 transmits a flash memory read success notification including the read data to the host computer 10 (S2007), and then terminates the flash memory read process. Incidentally, the refresh process of S2006 may also be carried out after having transmitted the read data to the host computer 10.

Figure 21:
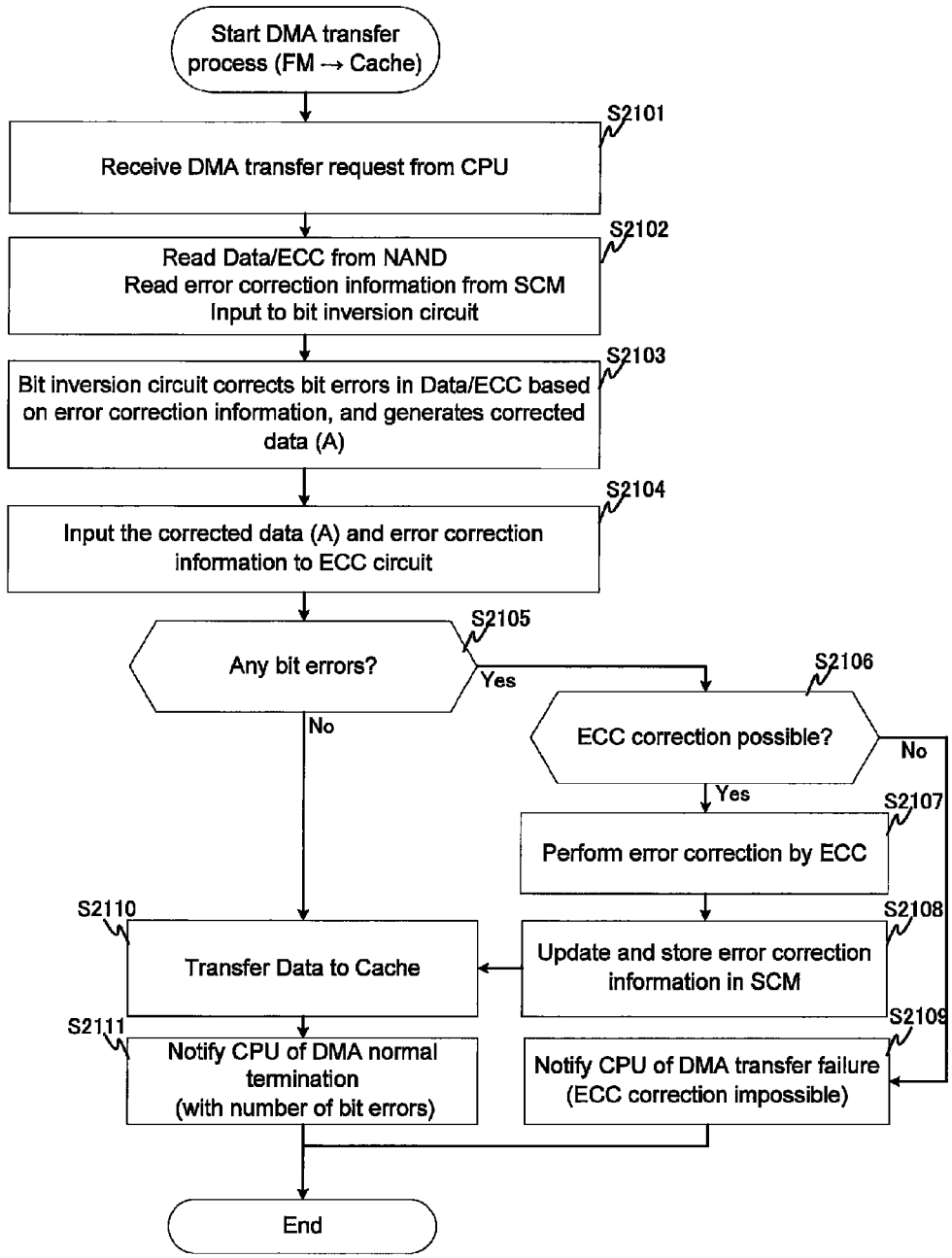
FIG. 21 is a flow chart of a DMA transfer process from an FM chip to the cache according to the first embodiment.

FIG. 21 is a flow chart of a DMA transfer process from the flash memory to the cache memory according to the first embodiment. This DMA transfer process is a process corresponding to S2003 of FIG. 20.

Upon receipt of an instruction from the CPU 211 to DMA transfer data from the NAND FM chip 221 to the cache memory 212 (S2101), the DMA circuit 2151 reads the read data and the ECC from the NAND FM chip 221, and reads the error correction information about the read data and the ECC from the SCM FM chip 222. Next, the DMA circuit 2151 transfers the read data and the read ECC as well as the error correction information to the bit inversion circuit 2152 (S2102).

Based on the error correction information, the bit inversion circuit 2152 corrects the bit errors occurring in the read data and the ECC and thereby generates the corrected data (S2103). As a result, those bits contained in the error correction information are corrected to their normal values. Incidentally, if the error correction information is in the initial value, the bit inversion circuit 2152 will not correct the read data or the ECC. Subsequently, the bit inversion circuit 2152 transfers the corrected data (the read data and the ECC after the correction) to the ECC circuit 2153 (S2104). Incidentally, if correction has not been performed, then the bit inversion circuit 2152 directly transfers the read data and the ECC to the ECC circuit 2153.

Based on the ECC transferred from the bit inversion circuit 2152, the ECC circuit 2153 checks whether bit errors exist in the transferred read data and ECC (S2105). As a result, if no bit error exists (S2105: "No"), the ECC circuit 2152 transfers the read data to the cache memory 212 (S2110). The ECC circuit 2152 notifies the CPU 211 that the DMA transfer process has been terminated normally. As this point, the ECC circuit 2152 notifies the CPU 211 of the number of bit errors that had been occurring in the read data and the ECC prior to the transfer to the bit inversion circuit 2152 (S2111), and then terminates the DMA transfer process.

Alternatively, if bit errors exist (S2105: "Yes"), the ECC circuit 2152 checks whether the total number of bit errors is the number of bit errors that can be corrected by using the ECC (S2106). As a result, if the total number of bit errors is not the number of bit errors that can be corrected by using the ECC (S2106: "No"), then the ECC circuit 2152 notifies the CPU 211 that the DMA transfer process has not been terminated normally (ECC correction impossible) (S2109), and then terminates the DMA transfer process.

Alternatively, if the total number of bit errors is the number of bit errors that can be corrected by using the ECC (S2106: "Yes"), then the ECC circuit 2152 performs correction of bit errors on the read data and the ECC by using the ECC (S2107). Next, the ECC circuit 2152 updates the error correction information. At this point, the ECC circuit 2152 adds information about the bit errors it has corrected (an error correction information element relating to a new bit error) to the error correction information. The ECC circuit 2152 stores the updated error correction information to the SCM FM chip 222 (S2108). This updated error correction information is used subsequently to perform S2103. Then, the ECC circuit 2152 transfers the corrected read data to the cache memory 212 (S2110). Thereafter, the ECC circuit 2152 notifies the CPU 211 that the DMA transfer process has been terminated normally. At this point, the ECC circuit 2152 notifies the CPU 211 of the number of bit errors that had been occurring in the read data and the ECC prior to the transfer to the bit inversion circuit 2152 plus the number of bit errors that were newly detected at S2105 (S2111), and then terminates the DMA transfer process.

Figure 22:
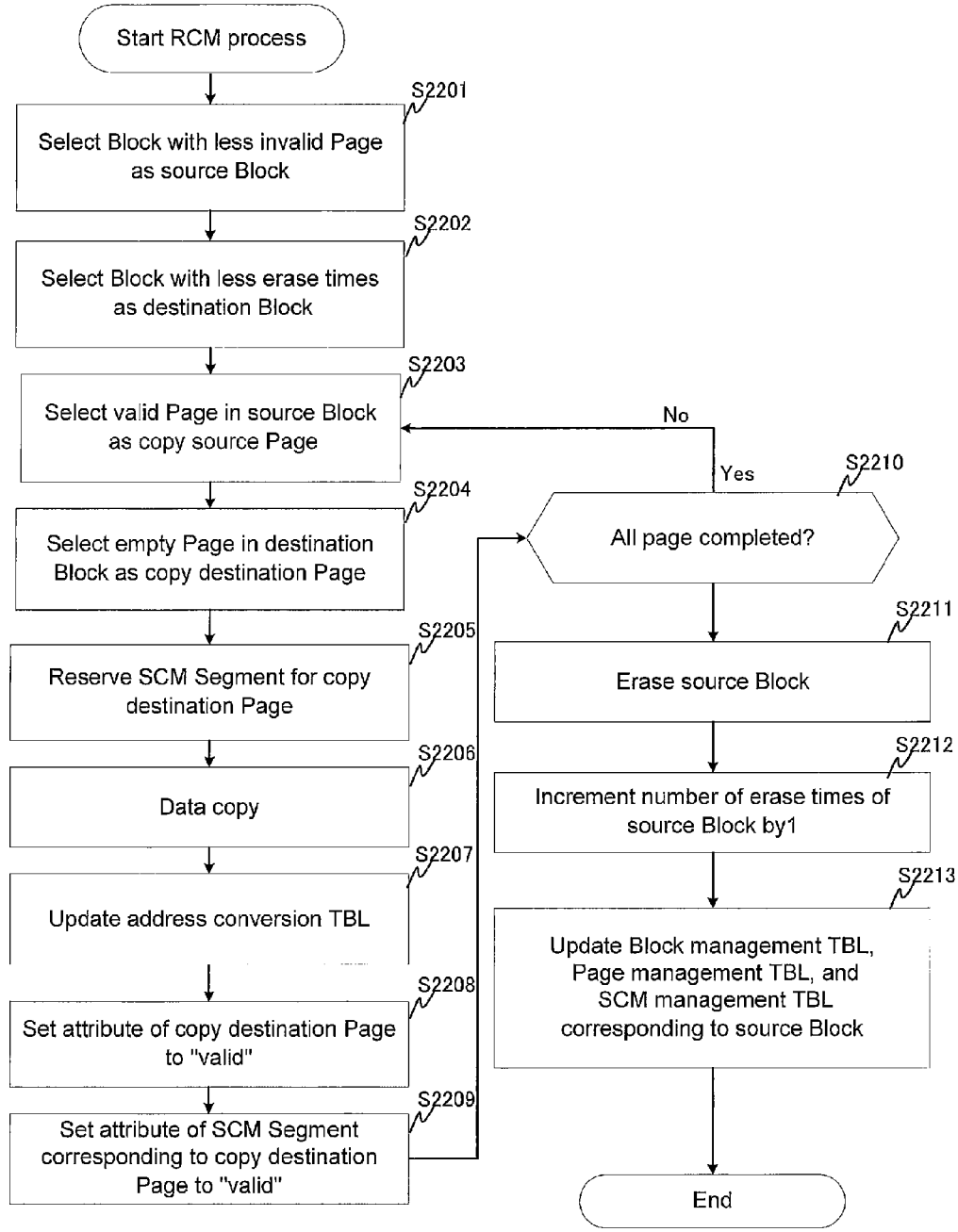
FIG. 22 is a flow chart of a reclamation process according to the first embodiment.

FIG. 22 is a flow chart of a reclamation process according to the first embodiment. For example, the reclamation process is a process corresponding to S1809 of FIG. 18.

The FM controller 215 refers to the page management table 1124 for Block #1402, Physical Page #1403, and Page Attribute 1404 to select a block with less valid pages as a reclamation target (source) block (S2201). For example, the FM controller 215 calculates the number of valid pages for each block, compares the calculated number of valid pages against the pre-configured threshold, and selects one of those blocks that contain a number of valid pages that is less than the threshold as a reclamation target (source) block. Incidentally, in S1809 of FIG. 18, it is reasonable to assume that at least a block storing new data is the reclamation target.

Next, the FM controller 215 refers to the block management table 1123 for Block #1302 and Erase Times 1304 to select a block with less erase times as a destination block (S2202). For example, the FM controller 215 compares the erase times for each block against the pre-configured threshold to select a block that has less erase times less than the threshold as a candidate for destination block. Further, the FM controller 215 refers to the page management table 1124 for Page Attribute 1404 corresponding to the block selected as a candidate for destination block to select as a destination block one of those candidate destination blocks that contain a number of empty physical pages (physical pages with Page Attribute 1404 of "Empty") that is equal to or larger than the total number of source physical pages.

The FM controller 215 selects all valid physical pages of the source block selected in S2201 as source physical pages (S2203). In addition, the FM controller 215 selects empty physical pages of the destination block selected in S2202 as destination physical pages (S2204).

Next, the FM controller 215 refers to the segment management table 1125 for Attribute 1504 to reserve from the SCM FM chip 222 segments to be mapped to empty physical pages considered as the copy destination (segments with Attribute 1504 of "N") (S2205).

Next, the FM controller 215 copies data from the source physical pages to the destination physical pages (S2206). The FM controller 215 updates the address conversion table 1122 (S2207). Specifically, the FM controller 215 updates Physical page #1204 corresponding to the source physical pages to Physical Page # of the destination physical pages in the address conversion table 1122, and updates Segment #1205 to the numbers of the segments reserved in S2205.

Subsequently, the FM controller 215 configures Attribute 1404 of the entries corresponding to the destination physical pages as "Valid" in the page management table 1124 (S2208). In addition, the FM controller 215 configures Attribute 1504 of the entries of the segments mapped to the destination physical pages as "Valid" in the segment management table 1125 (S2209).

The FM controller 215 checks whether data has been moved from all of the source physical pages to the destination physical pages (S2210). As a result, if data has not been moved from all of the source physical pages (S2210: "No"), then the FM controller 215 proceeds to the process of S2203.

Alternatively, if data has been moved from all of the source physical pages (S2210: "Yes"), then the FM controller 215 erases all data stored in the source block selected in S2201 (S2211). Next, the FM controller 215 configures Attribute 1303 of the entry corresponding to the block from which data has been erased as "N" in the block management table 1123, and then increments the value of Erase Times 1304 by "1" (S2212).

The FM controller 215 updates the tables relating to the source block (the block management table 1123, page management table 1124, and segment management table 1125) (S2213). Specifically, for example, the FM controller 215 configures Attribute of the entry corresponding to the source block as "N" and Number of Valid Pages 1304 as "0" in the block management table 1123. In addition, the FM controller 215 configures Page Attribute 1404 of all of the physical pages 1403 of the entry corresponding to the source block as "Empty" in the page management table 1124.

Thereafter, the FM controller 215 terminates the RCM process.

Figure 23:
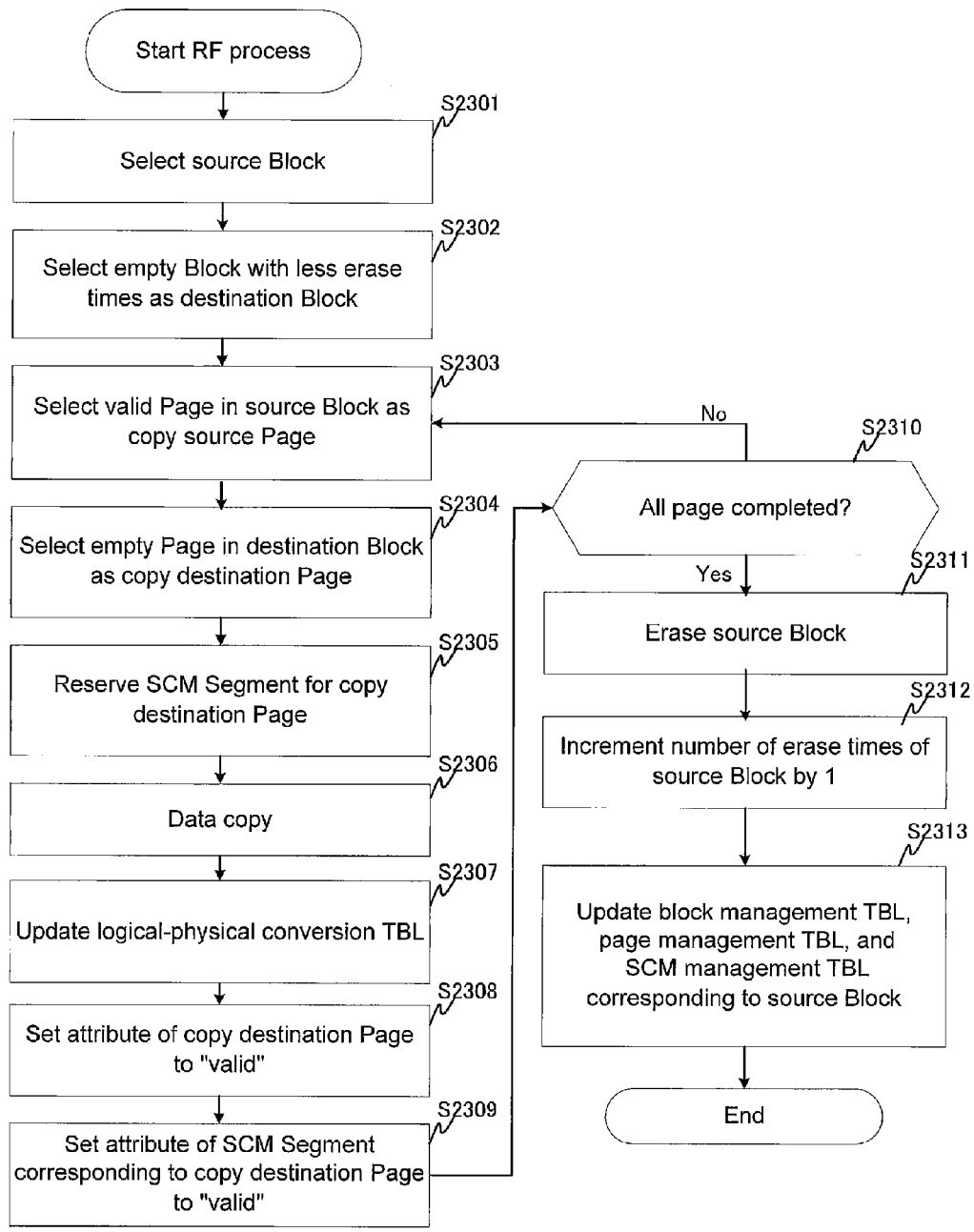
FIG. 23 is a flow chart of a refresh process according to the first embodiment.

FIG. 23 is a flow chart of a refresh process according to the first embodiment. For example, the refresh process is a process corresponding to S2006 of FIG. 20.

The FM controller 215 refers to the page management table 1124 for Block #1402, Physical Page #1403 and Number of Bit Errors Occurred 1405 to select a block as a refresh target block that contains a page where a large number of bit errors are occurring (a source block) (S2301). For example, the FM controller 215 calculates the number of bit errors for each physical page, compares the calculated number of bit errors against the pre-configured threshold, and selects one of those blocks that contain physical pages where a large number of bit errors are occurring as a reclamation target (source) block. In addition, the FM controller 215 may predefine a threshold for each of the CWs corresponding to CW#14052-14054, compare the respective bit errors that are occurring in the CWs against the respective thresholds of the CWs, and select one of those blocks that contain physical pages with CWs where a number of bit errors are occurring exceeding the respective thresholds as a reclamation target (source) block.

Next, the FM controller 215 refers to the block management table 1123 for Block #1302 and Erase Times 1304 to select a block with less erase times as a destination block (S2302). For example, the FM controller 215 compares the erase times of each block with the pre-configured threshold to select one of those blocks that have been erased a number of times less than the threshold as a candidate for destination block. Further, the FM controller 215 refers to the page management table 1124 for Page Attribute 1404 of the block selected as a candidate for destination block to select as a destination block one of those candidate destination blocks that contain a number of empty physical pages (physical pages with Page Attribute 1404 of "Empty").

The FM controller 215 selects all valid physical pages of the source block selected in S2301 as source (copy source) physical pages (S2303). In addition, the FM controller 215 selects empty physical pages of the destination block selected in S2302 as destination (copy destination) physical pages (S2304).

The FM controller 215 refers to the segment management table 1125 for Attribute 1504 to reserve from the SCM FM chip 222 segments to be mapped to physical pages considered as the copy destination (segments with Attribute 1504 of "N") (S2305).

The FM controller 215 copies data from the source physical pages to the destination physical pages (S2306). The FM controller 215 updates the address conversion table 1122

(S2307). Specifically, the FM controller 215 updates Physical page #1204 corresponding to the source physical pages to Physical Page # of the destination physical pages in the address conversion table 1122, and updates Segment #1205 to the numbers of the segments reserved in S2305.

Subsequently, the FM controller 215 configures Attribute 1404 of the entries corresponding to the destination physical pages as "Valid" in the page management table 1124 (S2308). In addition, the FM controller 215 configures Attribute 1504 of the entries of the segments mapped to the destination physical pages as "Valid" in the segment management table 1125 (S2309).

Next, the FM controller 215 checks whether data has been moved from all of the source physical pages to the destination physical pages (S2310). If data has not been moved from all of the source physical pages (S2310: "No"), then the FM controller 215 proceeds to the process of S2303.

Alternatively, if data has been moved from all of the source physical pages (S2310: "Yes"), then the FM controller 215 erases all data stored in the source block selected in S2301 (S2311). Next, the FM controller 215 configures Attribute 1303 of the entry corresponding to the block from which data has been erased as "N" in the block management table 1123, and increments the value of Erase Times 1304 by "1" (S2312).

The FM controller 215 updates the tables relating to the source block (the block management table 1123, page management table 1124, and segment management table 1125) (S2313). Specifically, for example, the FM controller 215 configures Attribute of the entry corresponding to the source block as "N" and Number of Valid Pages 1304 as "0" in the block management table 1123. In addition, the FM controller 215 configures Page Attribute 1404 of all of the physical pages 1403 of the entry corresponding to the source block as "Empty" in the page management table 1124.

Thereafter, the FM controller 215 terminates the RF process.

Second Embodiment

Next, a second embodiment will be described below. Incidentally, description will be made of the difference from the first embodiment.

In the first embodiment, segments of the SCM FM chip 222 are mapped to all of the physical pages included in the NAND FM chip 221. In the second embodiment, segments are mapped to particular physical pages, rather than all of the physical pages, i.e., to only valid physical pages storing important data (management information such as the address conversion table 1122). This allows a plurality of segments to be mapped to one particular physical page. In this manner, an increased capacity may be provided for storing error correction information of the data stored in a particular physical page. Consequently, a larger amount of error correction information may be transferred to the bit inversion circuit 2152 when reading data stored in a particular physical page, as compared with the first embodiment. That is, the correctable limit number of bit errors may be increased for data stored in a particular physical page.

For example, a particular physical page to which a segment is mapped may be such a segment as described in the following (a) and (b):

(a) A physical page with a high rate of occurrence of bit errors, or a physical page containing a CW. As used herein, a page with a high rate of occurrence of bit errors means, for example, an odd-numbered physical page of Physical Page #1403 in the page management table 1124. Incidentally, an odd-numbered physical page in the page management table 1124 is a physical page that comprises the MSB (Most Significant Bit), provided that the NAND FM chip 221 is a MLC NAND flash memory chip.

(b) A physical page where read requests are frequently made. As used herein, a physical page where read requests are frequently made means, for example, a physical page that is involved in a number of read requests equal to or larger than a certain threshold per unit.

Third Embodiment

Next, a third embodiment will be described below. Incidentally, description will be made of the difference from the first embodiment.

In the first embodiment, since no bit error occurs in the write data and the ECC for the write data (hereinafter, the write ECC) when data is written to the NAND FM chip 221 for the first time, the ECC circuit 2153 generates an initial value as error correction information. In this case, assuming that the initial value of error correction information is all zeros, the bit inversion circuit 2152 cannot correct bit errors by using the initial value of error correction information. Thus, for example, in a read process at a first point in time, if the total number of bit errors that have been occurred in the write data and the write ECC exceeds the correctable limit number by the ECC circuit 2153, uncorrectable errors result.

In contrast, in the third embodiment, when writing data to the NAND FM chip 221 for the first time, the ECC circuit 2153 stores a part of the write data or a part of data of the write ECC as the initial value of error correction information. As a result, it may be possible to eliminate any bit errors in the write data or the write ECC by overwriting the bit errors with the part of the write data or the part of data of the write ECC that have been stored in the initial value. Consequently, it may be possible to reduce by the FM controller 215 the total number of bit errors that have occurred prior to the transfer to the ECC circuit 2153 based on the initial value of error correction information. This increases the likelihood that the bit errors can be corrected at the ECC circuit 2153.

In addition, as for important write data, the write data and the write ECC may be stored in their entirety as the initial value of error correction information, rather than a part of the write data or a part of data of the write ECC. It follows that the data recovery rate may be further increased as for important write data.

Fourth Embodiment

Next, a fourth embodiment will be described below. Incidentally, description will be made of the difference from the first embodiment.

In the first embodiment, the address conversion table 1122 is stored in the cache memory 212, whereas in the fourth embodiment, some or all of the address conversion table 1122 is stored in the SCM FM chip 222.

In the first embodiment, the address conversion table 1122 is stored in the cache memory 212, which is volatile storage medium. Thus, when cutting off the power supply to the SSD 20, it is necessary to save the address conversion table 1122 from the cache memory 212 to a flash memory chip (221, 222). However, the SSD 20 may stop before all of the data relating to the address conversion table 1122 can be saved to a flash memory chip (221, 222). Such a situation makes it difficult to recover the address conversion table 1122.

Accordingly, in the fourth embodiment, data recovery is enabled by storing a part or all of the address conversion table 1122 in a non-volatile SCM FM chip 222. As used herein, a part of the address conversion table 1122 may be, for example, a segment mapped to an LBA, attribute information as to whether the segment in question is valid or invalid, and information about a physical page mapped to the LBA. Consequently, even if the information relating to the address conversion table 1122 stored in the cache memory 212 is lost, the SCM controller 2212 may refer to the part of the address conversion table 1122 stored in the SCM FM chip 222 to rebuild the address conversion table 1122.

Fifth Embodiment

Next, a fifth embodiment will be described below. Incidentally, description will be made of the difference from the first embodiment.

In the fifth embodiment, the data size of an ECC relative to data is larger than that of an ECC in the first to fourth embodiments. Generally, as the data size of an ECC relative to data increases, the correctable limit number of bit errors occurring in that data becomes larger. However, if the data size of an ECC is simply increased, data may span across two pages and thus the performance of the SSD 20 may no longer be maintained, as mentioned earlier in conjunction with the problems. Therefore, in this embodiment, only the increased part of the data size of an ECC is stored in an SCM FM chip 222 so that data will not span two pages. That is, a part of data of an ECC having the same size as the first to fourth embodiments is stored in a NAND FM chip 221, while the rest of the ECC is stored in an SCM FM chip 222. In this embodiment, the ECC circuit 2153 uses a part of an ECC that is read from a NAND FM chip 221 and the rest of the ECC that is read from the SCM FM chip 222 to perform error correction of the read data.

Sixth Embodiment

Next, a sixth embodiment will be described below. Incidentally, description will be made of the difference from the first embodiment.

The sixth embodiment comprises FM chips 223 in the computer system of the first embodiment, in place of the NAND FM chips 221 and the SCM FM chips 222.

Figure 24:
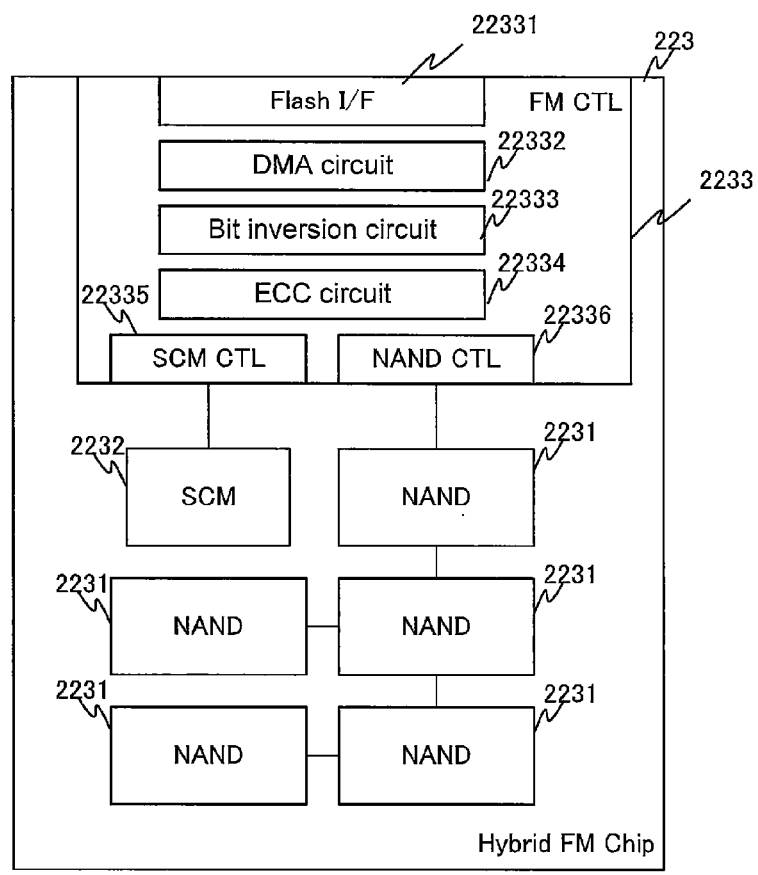
FIG. 24 is an internal structure of an FM chip according to a sixth embodiment.

FIG. 24 is an internal structure of an FM chip according to a sixth embodiment.

An FM chip 223 in the sixth embodiment includes an SCM flash memory part 2232, a NAND flash memory part 2231, and an FM controller 2233. The FM controller 2233 contains a Flash I/F 22331, a DMA circuit 22332, a bit inversion circuit 22333, an ECC circuit 22334, an SCM CTL 22335, and a NAND CTL 22336. The components of the FM controller 2233 perform substantially the same functions as those given the same names described in the first embodiment, and thus explanation thereof will be omitted. That is, in the sixth embodiment it can be considered that the FM controller 215 according to the first embodiment is incorporated in the FM chip 223.

In FIG. 24, it is also assumed that the SCM flash memory part 2232 is controlled by SCM CTL 22335 and the NAND flash memory part 2231 is controlled by the NAND CTL 22336. However, the SCM flash memory part 2232 and the NAND flash memory part 2231 may also be controlled by a common controller.

In this way, if an SCM flash memory part 2232 and a NAND flash memory part 2231 as well as an FM controller 2233 are mounted on one FM chip 223, the lifetime of the FM chip 223 may be prolonged as a single chip.

Seventh Embodiment

Next, a seventh embodiment will be described below.

Figure 25:
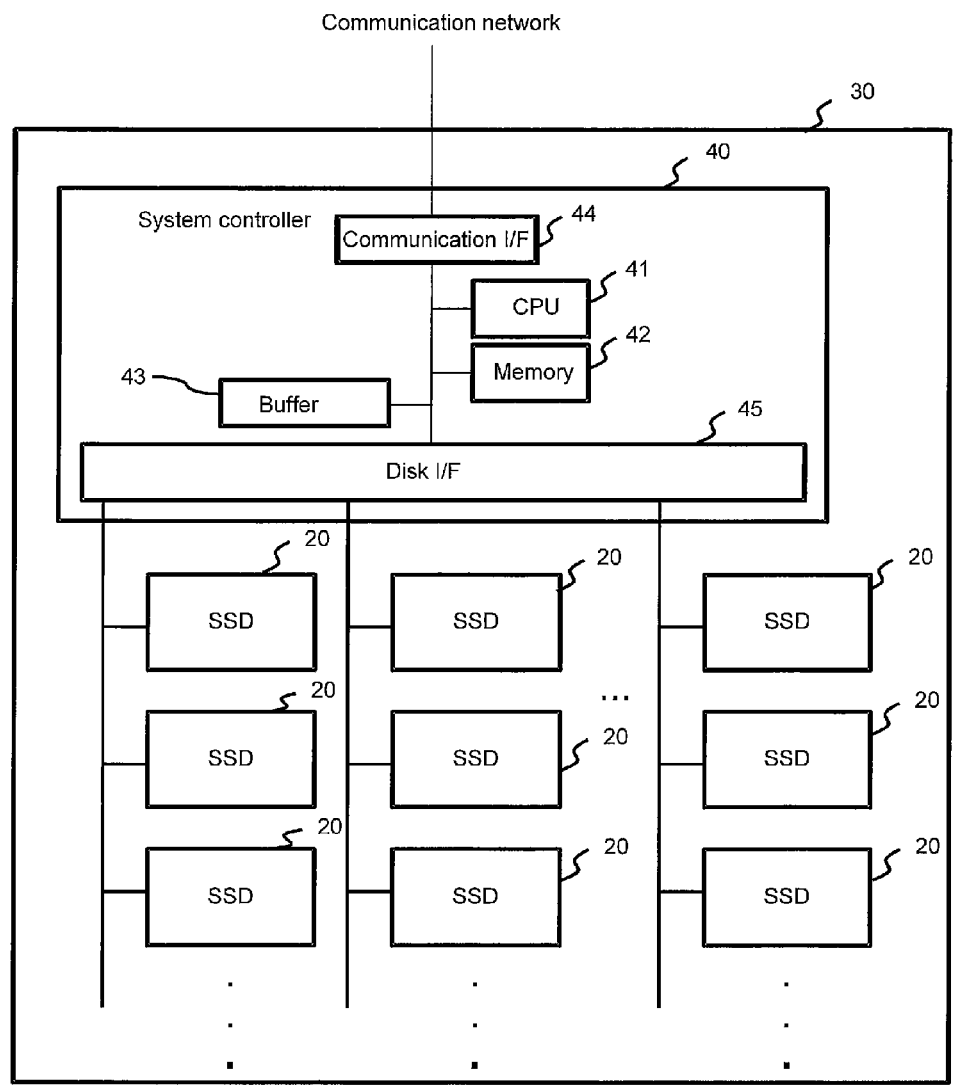
FIG. 25 is a schematic structure figure of the storage apparatus according to a seventh embodiment.

FIG. 25 is a schematic structure figure of the storage apparatus according to the seventh embodiment.

The storage apparatus 30 shown in FIG. 25 has the system controller 40 and a storage part which consists of two or more SSD 20. The system controller 40 comprises a communication interface device, a storage device, and a control device, which is coupled thereto. The communication interface devices, for example, are a communication I/F 44 for coupling to a communication network and a disk I/F 45 for coupling to the SSD 20. The system controller 40 is connected to a computer through a communication network. Moreover, the system controller 40 receives a read command/write command, and performs various processings to SSD. In this case of this embodiment, the higher rank equipment in FIG. 1 is a system controller. The storage devices, for example, are a memory 42 and a buffer 43. The control device, for example, is a CPU 41. The control device, in addition to a processor such as the CPU 41, may comprise a dedicated hardware circuit for performing prescribed processing (for example, compression, decompression, coding or decoding). The memory 42 stores a program and various types of information for controlling the SSD 20. The CPU 41 realizes various types of functions in accordance with executing the program based on the information stored in the memory 42. The buffer 43, for example, is a volatile memory, such as a DRAM. The buffer 43 temporarily stores data to be written to the SSD 20, data read from the SSD 20, and so forth.

RAID (Redundant Array of Independent Disks) of a predetermined level consists of two or more SSDs. For example, when RAID5 consists of four sets of SSDs, to three data of a certain regulation size, the system controller 40 generates one parity (redundant data), and distributes and stores it in four sets of SSDs. In this case, the system controller 40 can restore the data which broke from three sets of other SSDs, even if the data stored in one set of a certain SSD breaks.

Here, the flash memory read processing in this case of this embodiment is explained. The overlapping explanation is omitted although FIG. 20 is used. First, the system controller 40 transmits a read command to SSD according to the Read demand from a computer. The FM controller 215 receives a read command from the system controller 40, and flash memory read processing is performed.

The FM controller 215 confirms whether read data has been read normally. When it is not able to read normally, the FM controller 215 reports that the read of data went wrong to the system controller 40. The system controller 40 restores data by the function of RAID mentioned above, when the notice of read failure is received. And the system controller 40 transmits the restored data to a computer. Furthermore, the system controller 40 carries out the write of the restored data to the original SSD. The write processing in SSD is the same as the processing shown in FIG. 18.

Even if it is a case where the error by ECC which cannot be corrected occurs by this, restoration of the data based on the system controller 40 is attained, and the reliability of a system can be improved further.

Here, when the object of a read straddles two or more pages, the still more nearly following processings are also possible. When it reads data ranging over two or more pages, the page in which ECC correction is possible, and an impossible page may be intermingled. The FM controller 215 gives the information which discriminates whether it was impossible whether ECC correction was possible from the FM controller 215 for every page to the system controller 40 in the case of the response to the system controller 40.

Thereby, the system controller 40 transmits to a computer the data by which ECC correction was carried out as it is, and it can restore and it can transmit to a computer the data in which ECC correction is impossible. Therefore, the system controller 40 can restore data efficiently.

Some embodiments of the present invention have been described. However, the present invention is not limited to the disclosed embodiments. For example, in the first embodiment, when an update request was issued by the host computer 10 for data stored in a physical page, a physical page and a segment were properly mapped to an LBA. However, depending on the specifications of SCM FM, the correspondence between an LBA and a segment may be fixed. That is, since the NAND FM chip 221 does not allow overwriting of data, when an update request for data is issued, it is necessary to store the update data in a new physical page and map the new physical page to an LBA. However, the SCM FM chip 222 may also be configured to allow overwriting of data. If the SCM FM chip 222 is so configured, error correction information relating to old data may be overwritten with error correction information relating to the update data, and the error correction information relating to the update data may be read for use while keeping the correspondence between the segment and the LBA fixed.

In addition, while the SSD 20 is provided with the bit inversion circuit 2152 and the ECC circuit 2153 in the first embodiment, the present invention is not limited to such a circuit configuration and any configurations may be used that carry out the functionality of the bit inversion circuit 2152 and the ECC circuit 2153.

REFERENCE SIGNS LIST

10 Higher-level device
20 SSD
215 FM controller
221 NAND FM chip
222 SCM FM chip

The invention claimed is:
1. A flash memory device comprising:
a storage part including a first-type flash memory part and a second-type flash memory part; and
a flash memory controller configured to control the storage part, wherein
when writing data to be written to the first-type flash memory part, the flash memory controller is configured to:
 (A1) generate a redundant code relating to the data; and
 (A2) write the data and the redundant code generated in (A1) to the first-type flash memory part,
when reading the data written to the first-type flash memory part, the flash memory controller is configured to:
 (B1) read the data and the redundant code from the first-type flash memory part;
 (B2) correct any bit errors occurring in the data and the redundant code based on the redundant code;
 (B3) generate error correction information including positions of the bit errors corrected in (B2) as well as values at the positions of the bit errors corrected in (B2) before the bit errors occurred; and
 (B4) write the error correction information to the second-type flash memory part, and
subsequently, when reading the data written to the first-type flash memory part, the flash memory controller is configured to:
 (C1) read the data and the redundant code from the first-type flash memory part;
 (C2) read the error correction information corresponding to the data from the second-type flash memory part;
 (C3) correct the data and the redundant code read from the first-type flash memory part based on the error correction information generated in (B3);
 (C4) correct any bit errors occurring in the data and the redundant code corrected in (C3) based on the redundant code corrected in (C3);
 (C5) update the error correction information generated in (B3) by adding, to the error correction information, positions of the bit errors corrected in (C4) as well as values at the positions of the bit errors corrected in (C4) before the bit errors occurred; and
 (C6) write the updated error correction information to the second-type flash memory part,
wherein the first-type flash memory part comprises a NAND (NotAND) flash memory and the second-type flash memory part comprises an SCM (Storage Class Memory) flash memory,
wherein the flash memory controller is configured to:
 in (A2), write the data to a physical page of the NAND flash memory included in the first-type flash memory part;
 in (B4) and (C6), write the error correction information to a segment, the segment being obtained by dividing a storage space of the SCM flash memory included in the second-type flash memory part by a predetermined size; and
 map the segment to the physical page based on mapping information defining a relationship between the segment and the physical page and based on information defining a relationship between a logical block address and physical address information of the physical page; and
wherein when writing the data to be written to the first-type flash memory part, the flash memory controller is configured to:
 (A3) generate the error correction information with a predetermined initial value; and
 (A4) write the error correction information to the second-type flash memory part, and
when reading the data written to the first-type flash memory part, the flash memory controller is configured to:
 (D1) read the error correction information corresponding to the data from the second-type flash memory part; and
 (D2) if the error correction information is set to the initial value, then perform (B1) through (B4) including storing the initial value of the error correction information in the second-type flash memory part, and if the error correction information is not set to the initial value, then perform (C1) and (C3) through (C6) without performing (B1) through (B4).
2. A flash memory device according to claim 1, wherein the flash memory controller comprises a redundant code generation circuit and a bit inversion circuit,
wherein the redundant code generation circuit is configured to perform (A1), (B2), (B3), (C4) and (C5), and wherein the bit inversion circuit is configured to correct, in (C3), any bit errors occurring in the data and the redundant code read from the first-type flash memory by inversion based on the error correction information.

3. A flash memory device according to claim 1, wherein the flash memory controller is configured to:
   detect whether any bit errors have occurred for each partial physical page which is obtained by dividing the physical page by an arbitrary size, and if any bit errors have occurred in the partial physical page, then allocate some storage regions in the segment mapped to the physical page to error correction information elements indicative of positions of the bit errors and values before the bit errors occurred, and then store the error correction information elements in the some storage regions allocated.

4. A flash memory device according to claim 3, wherein the flash memory controller is configured to:
   map a plurality of the segments to a particular physical page that is susceptible to bit errors or that stores data of high importance; and
   not map the segment to a physical page that is less susceptible to bit errors or that does not store data of high importance.

5. A flash memory device according to claim 4, wherein the flash memory controller is configured to:
   if any error bits have occurred in the partial physical page, then store error correction information elements relating to the error bits occurring in the partial physical page in some storage regions allocated from the plurality of segments.

6. A flash memory device according to claim 3, wherein the first-type flash memory part, the second-type flash memory part, the redundant code generation circuit, and the bit inversion circuit are contained in the same chip.

7. A flash memory device according to claim 1, wherein
   when writing the data to be written to the first-type flash memory part, the flash memory controller is configured to:
      (A5) generate the error correction information with a part of the data or a part of data of the redundant code as its initial value; and
      (A6) write the error correction information to the second-type flash memory part, and
   when reading the data written to the first-type flash memory part, the flash memory controller is configured to:
      (B5) read the error correction information corresponding to the data from the second-type flash memory part; and
      (B6) if the error correction information is error correction information with a part of the data or a part of data of the redundant code as its initial value, then overwrite the data and the redundant code having been read in (B1) with the part of the data or the part of data of the redundant code prior to performing (B2), and subsequently perform (B2) with the overwritten data and redundant code.

8. A flash memory device according to claim 1, wherein
   when the data to be written is written to the first-type flash memory part, the flash memory controller is configured to:
      (A5) generate the error correction information with all of the data or all of the redundant code as its initial value; and
      (A6) write the error correction information to the second-type flash memory part, and
   when the data written to the first-type flash memory part is read, the flash memory controller is configured to:
      (B5) read the error correction information corresponding to the data from the second-type flash memory part,
      (B6) if the error correction information is error correction information with all of the data or all of the redundant code as its initial value, then overwrite the data and the redundant code having been read in (B1) with the data or data of the redundant code prior to performing (B2), and subsequently perform (B2) with the overwritten data and redundant code.

9. A flash memory device according to claim 1, wherein the flash memory controller is configured to:
   store in the segment a part or all of management information for managing a correspondence relationship between the physical page and the data stored in the physical page.

10. A flash memory device according to claim 1, wherein the flash memory controller is configured to:
    temporarily store in the segment a part or all of data transmitted from a higher device or data transferred from the first-type flash memory part.

11. A flash memory device according to claim 1, wherein the flash memory controller is configured to:
    store a part of the redundant code in the segment;
       in (B1) and (C1), read a part of the redundant code from the segment; and
       in (B2) and (C3), perform a process with redundant data containing a part of the redundant code read from the segment.

12. A storage control method by a flash memory device, the flash memory device comprising: a storage part including a first-type flash memory part and a second-type flash memory part; and a flash memory controller configured to control the storage part, the storage control method comprising:
    when writing data to be written to the first-type flash memory part,
       (a1) generating a redundant code relating to the data; and
       (a2) writing the data and the redundant code generated in (a1)) to the first-type flash memory part,
    when reading the data written to the first-type flash memory part,
       (b1) reading the data and the redundant code from the first-type flash memory part;
       (b2) correcting any bit errors occurring in the data and the redundant code based on the redundant code;
       (b3) generating error correction information including positions of the bit errors corrected in (b2) as well as values at the positions of the bit errors corrected in (b2) before the bit errors occurred; and
       (b4) writing the error correction information to the second-type flash memory part, and
    subsequently, when reading the data written to the first-type flash memory part,
       (c1) reading the data and the redundant code from the first-type flash memory part;
       (c2) reading the error correction information corresponding to the data from the second-type flash memory part;
       (c3) correcting the data and the redundant code read from the first-type flash memory part based on the error correction information generated in (b3);
       (c4) correcting any bit errors occurring in the data and the redundant code corrected in (c3) based on the redundant code corrected by (C3);

(c5) updating the error correction information generated in (b3) by adding, to the error correction information, positions of the bit errors corrected in (C4) as well as values at the positions of the bit errors corrected in (c4) before the bit errors occurred; and
(c6) writing the updated error correction information to the second-type flash memory part,
wherein the first-type flash memory part comprises a NAND (NotAND) flash memory and the second-type flash memory part comprises a SCM (Storage Class Memory) flash memory,
wherein the storage control method comprising:
  in (a2), writing the data to a physical page of the NAND flash memory included in the first-type flash memory part;
  in (b4) and (c6), writing the error correction information to a segment, the segment being obtained by dividing a storage space of the SCM flash memory included in the second-type flash memory part by a predetermined size;
  mapping the segment to the physical page based on mapping information defining a relationship between the segment and the physical page and based on information defining a relationship between a logical block address and physical address information of the physical page; and
wherein when writing the data to be written to the first-type flash memory part:
  (a3) generating the error correction information with a predetermined initial value; and
  (a4) writing the error correction information to the second-type flash memory part, and
when reading the data written to the first-type flash memory part,
  (d1) reading the error correction information corresponding to the data from the second-type flash memory part; and
  (d2) if the error correction information is set to the initial value, then perform (b1) through (b4) including storing the initial value of the error correction information in the second-type flash memory part, and if the error correction information is not set to the initial value, then performing (c1) and (c3) through (c6) without performing (b1) through (b4).

* * * * *